United States Patent
Iyasu et al.

(10) Patent No.: US 11,245,326 B2
(45) Date of Patent: Feb. 8, 2022

(54) CONTROL APPARATUS FOR ELECTRICAL POWER CONVERTER

(71) Applicant: DENSO CORPORATION, Kariya (JP)

(72) Inventors: Seiji Iyasu, Nisshin (JP); Yuji Hayashi, Nisshin (JP); Yuichi Handa, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/073,830

(22) Filed: Oct. 19, 2020

(65) Prior Publication Data

US 2021/0036599 A1 Feb. 4, 2021

Related U.S. Application Data

(63) Continuation of application No. PCT/JP2019/015777, filed on Apr. 11, 2019.

(30) Foreign Application Priority Data

Apr. 17, 2018 (JP) .............................. JP2018-079397

(51) Int. Cl.
  *H02M 1/42* (2007.01)
  *H02M 1/12* (2006.01)
  *H02M 7/217* (2006.01)

(52) U.S. Cl.
  CPC .............. *H02M 1/12* (2013.01); *H02M 7/217* (2013.01); *H02M 1/4225* (2013.01); *H02M 1/4266* (2013.01)

(58) Field of Classification Search
  CPC ........................... H02M 1/4225; H02M 1/4266
  (Continued)

(56) References Cited

U.S. PATENT DOCUMENTS 9,184,674 B2 * 11/2015 Iyasu ................... H02M 1/4258
2012/0314461 A1 * 12/2012 Yoshikawa ......... H02M 1/4225
  363/40

(Continued)

FOREIGN PATENT DOCUMENTS

JP    2015-198460 A    11/2015
JP    2016082680 A *    5/2016 .............. H02M 1/15
JP    2018-137841 A    8/2018

OTHER PUBLICATIONS

Jun. 11, 2019 International Search Report issued in International Patent Application No. PCT/JP2019/015777.

(Continued)

*Primary Examiner* — Gary A Nash
(74) *Attorney, Agent, or Firm* — Oliff PLC

(57) ABSTRACT

The control apparatus is used with the electrical power converter working to an inputted one of ac voltage and a terminal-to-terminal voltage at a capacitor into the other. The control apparatus calculates a sine-wave command value for a reactor current based on the ac voltage and an amplitude command value indicating an amplitude of the reactor current. The control apparatus also operates switches SW in peak-current mode control to bring the reactor current into agreement with a command value for the reactor current to which a current correction value is added. The control apparatus sets the current correction value to include a component of fluctuation in the terminal-to-terminal voltage at the capacitor based on the ac voltage Vac.

9 Claims, 21 Drawing Sheets

(58) Field of Classification Search
USPC .................................................. 363/89, 127
See application file for complete search history.

(56) References Cited

U.S. PATENT DOCUMENTS

| | | | | |
|---|---|---|---|---|
| 2013/0342139 | A1* | 12/2013 | Shimomugi | ............ H02P 27/00 |
| | | | | 318/400.3 |
| 2014/0285163 | A1* | 9/2014 | Lin | ......................... H02M 1/42 |
| | | | | 323/205 |
| 2015/0372588 | A1* | 12/2015 | Jiang | ................... H02M 1/4225 |
| | | | | 323/210 |

OTHER PUBLICATIONS

Takaharu Takeshita et al. "DC Voltage Control and Harmonic Current Suppression of Single-Phase PFC Converter". T. IEE Japan, vol. 121-D, No. 10, 2001, pp. 1041-1048.

* cited by examiner

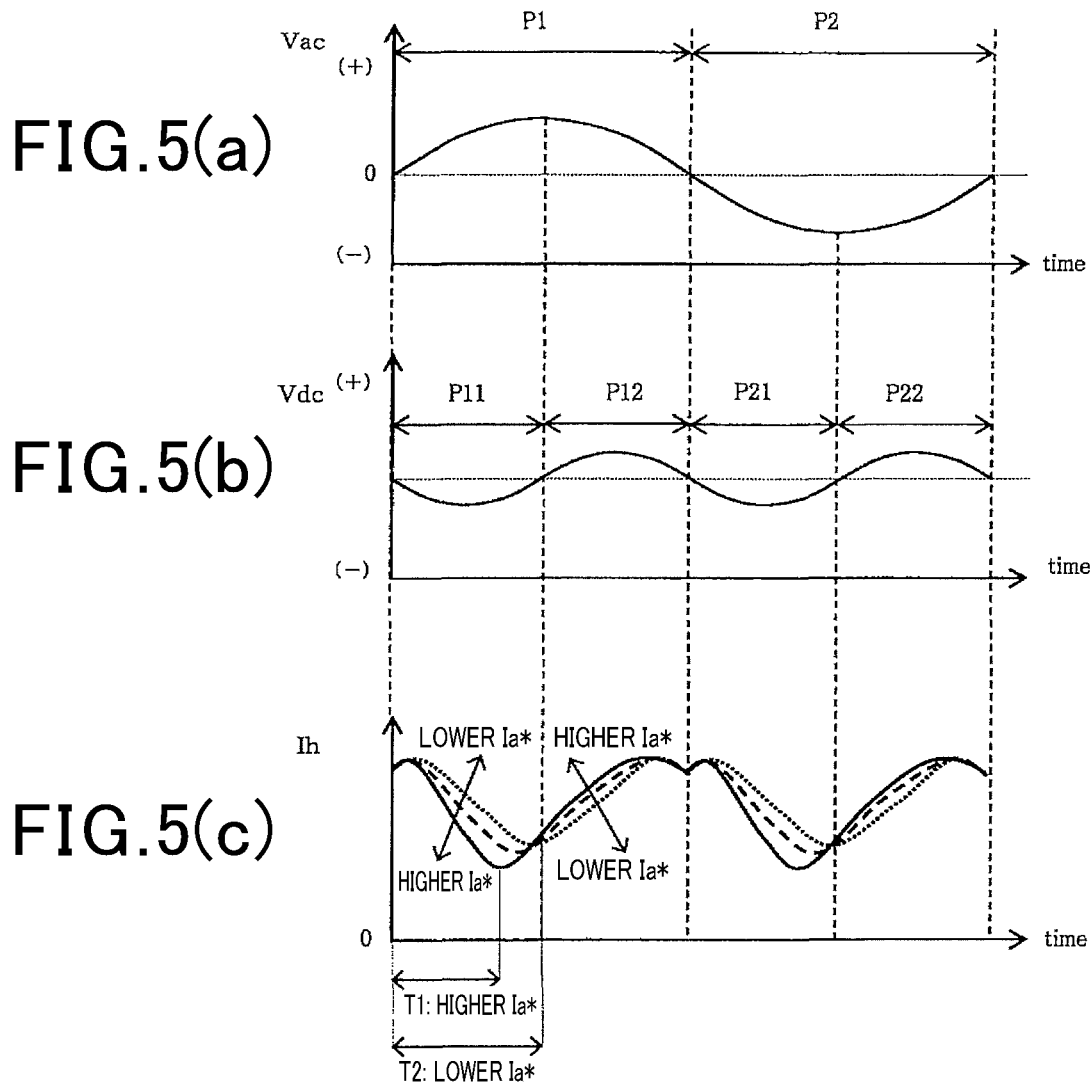
FIG.5(a)
FIG.5(b)
FIG.5(c)
FIG.6
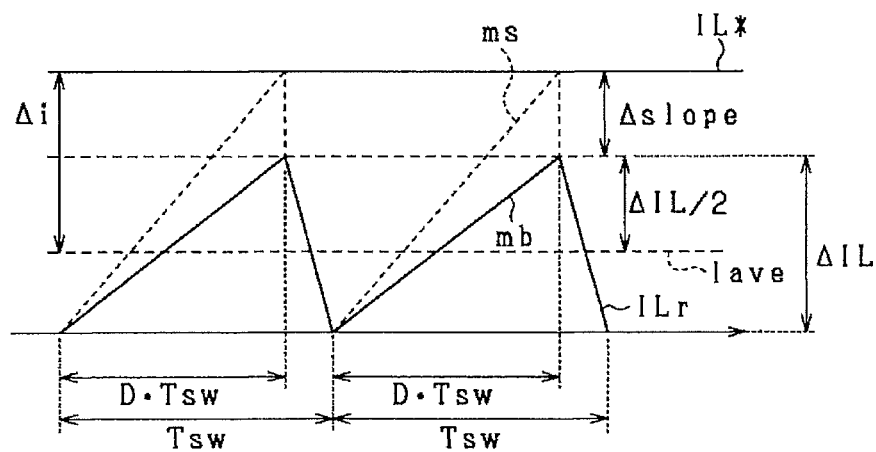

EMBODIMENT

Ic

COMPARATIVE EXAMPLE

Ic

ILr

ILr

Iac    THD:0.1%

Iac    THD:12%

EMBODIMENT

COMPARATIVE EXAMPLE

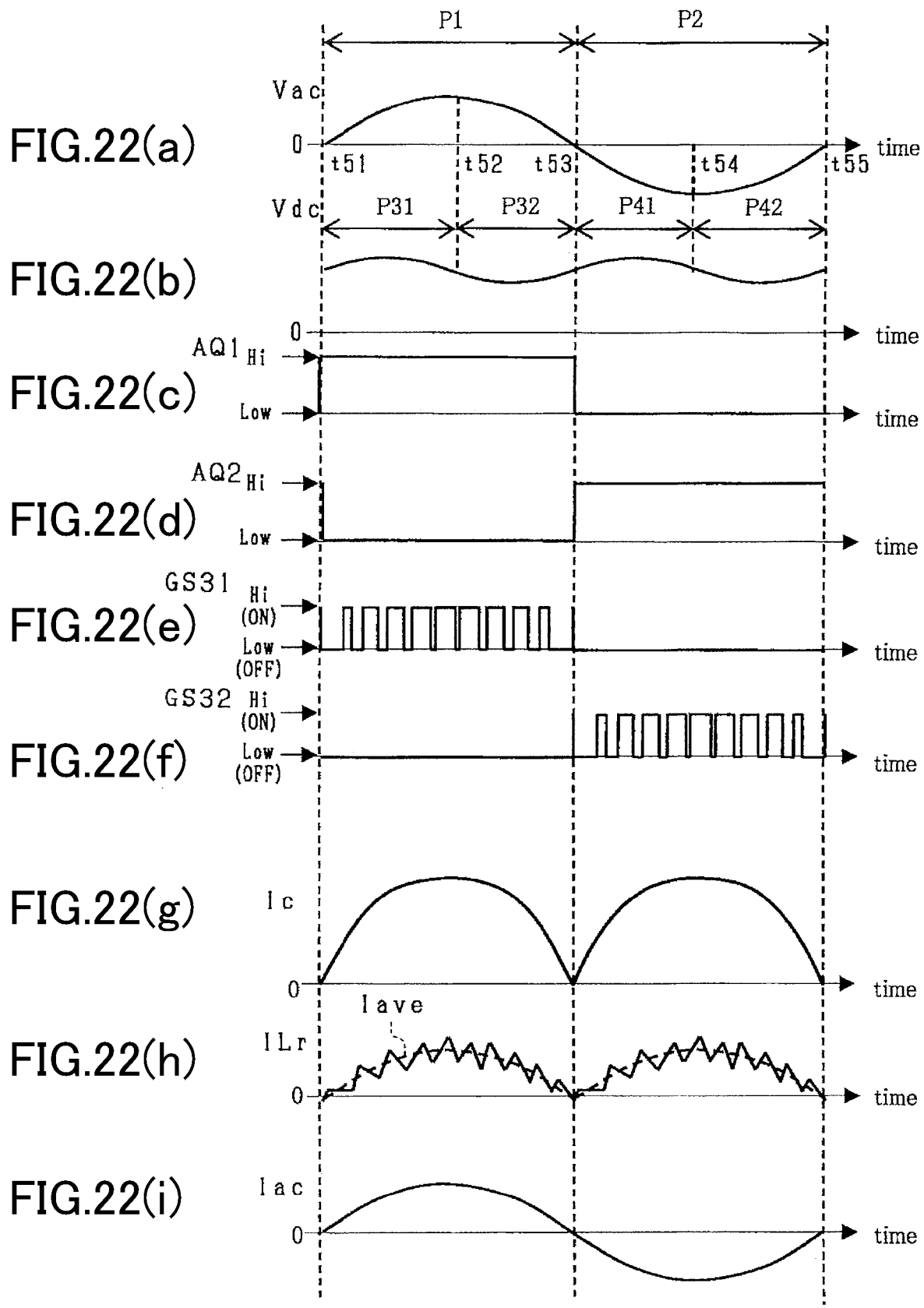

CONTROL APPARATUS FOR ELECTRICAL POWER CONVERTER

CROSS REFERENCE TO RELATED DOCUMENTS

The present application claims the benefit of priority of Japanese Patent Application No. 2018-079397 filed on Apr. 17, 2018, the disclosure of which is incorporated herein by reference.

TECHNICAL FIELD

This disclosure generally relates to a control apparatus for an electrical power converter.

BACKGROUND ART

For instance, patent literature 1 teaches a control apparatus for an electrical power converter which is equipped with a reactor, a drive switch, and a capacitor and works to convert an inputted one of an ac voltage and a terminal-to-terminal voltage at the capacitor into the other and output it. The control apparatus operates the drive switch under known peak-current mode control to bring a reactor current flowing in the reactor into agreement with a command value. The control apparatus adds a correction value which changes depending upon a phase of the ac voltage to the command value to reduce distortion of the ac current.

PRIOR ART LITERATURE

Patent Literature

Patent Literature 1: Japanese Patent First Publication No. 2015-198460

SUMMARY OF THE INVENTION

The current conversion device which achieves conversion of electrical power between the ac voltage and the terminal-to-terminal voltage at the capacitor has a risk that a variation in terminal-to-terminal voltage at the capacitor may result in a change in reactor current flowing in the reactor. This leads to concern about a difficulty in controlling the distortion of the ac current.

This disclosure was made in view of the above problems. It is an object to provide a control apparatus which may be used with an electrical power converter designed to covert an inputted one of an ac voltage and a terminal-to-terminal voltage at a capacitor into the other and is capable of suitably controlling distortion of an ac current.

In order to solve the above problem, there is provided a control apparatus according to this disclosure which is used with an electrical power converter which is equipped with a reactor, drive switches, and a capacitor and works to convert an inputted one of an ac voltage and a terminal-to-terminal voltage at the capacitor into the other. The control apparatus comprises: (a) a current obtaining portion which obtains a reactor current flowing in the reactor; (b) an ac voltage obtaining portion which obtains the ac voltage; (c) a command value calculating portion which calculates a sine-wave command value for the reactor current based on the obtained ac voltage; (d) a current correcting portion which determines a correction value to be added to the calculated command value; (e) a current controlling portion which operates the drive switches in peak-current mode control to bring the obtained reactor current into agreement with the command value to which the correction value is added. The current correcting portion sets the correction value to a value including a component of fluctuation in the terminal-to-terminal voltage based on the ac voltage.

A fluctuation in terminal-to-terminal voltage at the capacitor depends upon an amplitude of the ac voltage. The fluctuation in the terminal-to-terminal voltage at the capacitor which is applied to the reactor will result in a variation in reactor current. A cycle of fluctuation in the terminal-to-terminal voltage at the capacitor is, therefore, thought of as correlating with a cycle of fluctuation in reactor current. Based on this fact, the inventor of this application has found that the distortion of the ac voltage is minimized by determining the correction value based on the ac voltage as a function of a fluctuation in the terminal-to-terminal voltage at the capacitor.

In the above structure, the command value for the sine-wave reactor current is calculated using the obtained ac voltage. The drive switch is operated in the peak-current mode control to bring the obtained reactor current into agreement with the command value for the reactor current to which the correction value is added. The correction value is determined based on the obtained ac voltage as including a component of fluctuation in the terminal-to-terminal voltage at the capacitor. The determination of the correction value in view of the fluctuation in the reactor current arising from a variation in the terminal-to-terminal voltage enables the distortion of the ac voltage to be minimized.

BRIEF DESCRIPTION OF THE DRAWINGS

The above or other objects, features, or beneficial advantages of this disclosure will be understood more fully from the detailed description given hereinbelow and from the accompanying drawings.

In the drawings:

FIGS. 5(a) to 5(c) are views which describe a change in harmonic correction value;

FIG. 6 is a view which describes a deviation $\Delta I$;

FIGS. 22(*a*) to 22(*i*) are time charts for an electrical power converter.

EMBODIMENTS FOR CARRYING OUT THE INVENTION

First Embodiment

A control apparatus for an electrical power converter according this embodiment will be described below with reference to the drawings. The electrical power converter according to this embodiment works to cover an ac voltage, as delivered from an alternating-current source, into a dc voltage.

Figure 1:
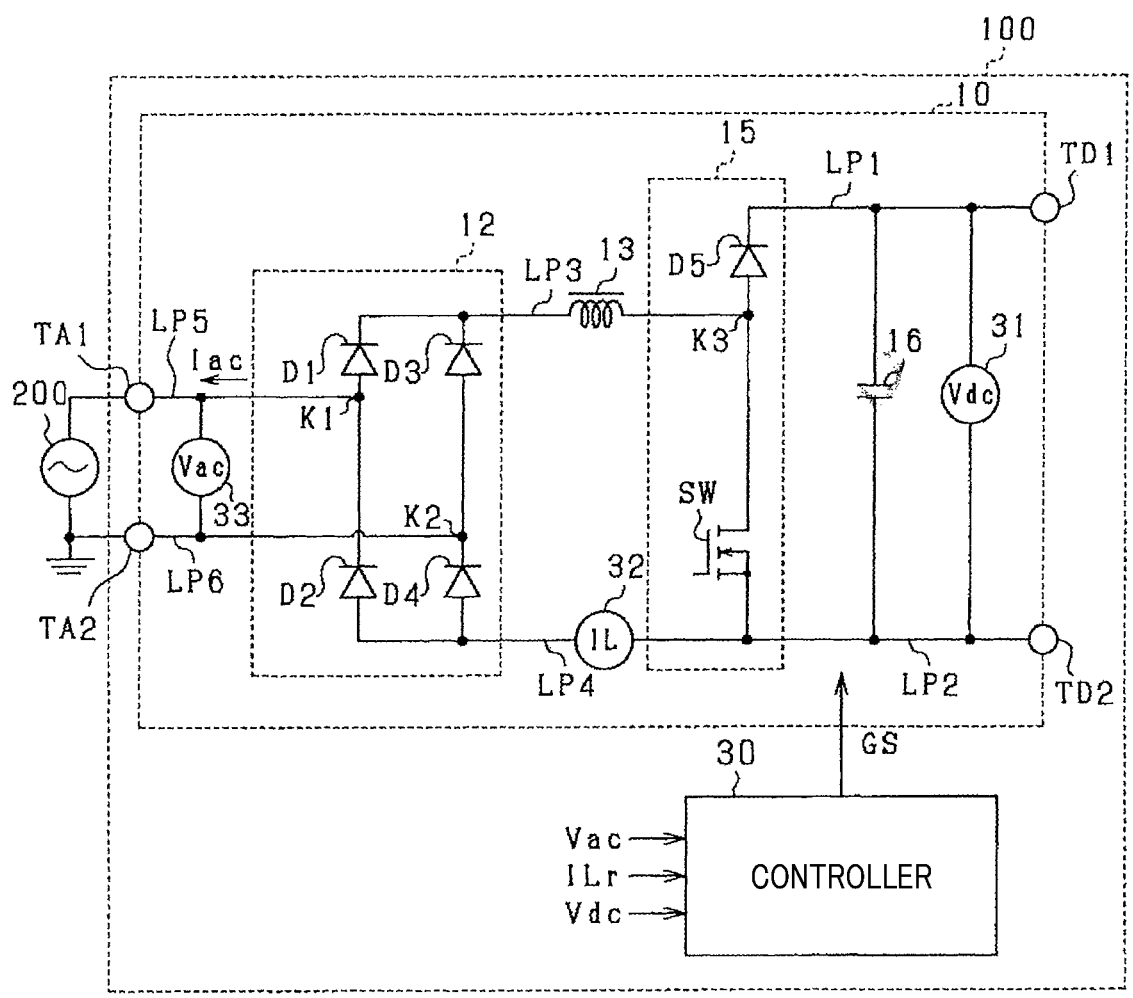
FIG. 1 is a structural view of an electrical power converter according to the first embodiment.

The electrical power converter 100 is, as illustrated in FIG. 1, equipped with the AC-DC converter 10. The AC-DC converter 10 is connected to the alternating-current source 200 through the first ac terminal TA1 and the second ac terminal TA2 and also connected to a device, not shown, through the first dc terminal TD1 and the second dc terminal TD2. The alternating-current source 200 is, for example, provided by a commercial power supply. The device includes at least one of a dc power supply, such as a battery, and a DC-DC converter.

The AC-DC converter 10 includes the full-bridge circuit 12, the half-bridge circuit 15, the reactor 13, the capacitor 16, and the first to sixth electrical wires LP1 to LP6.

The full-bridge circuit 12 is equipped with the first to fourth diodes D1 to D4. The first diode D1 has an anode connected to a cathode of the second diode D2. The third diode D3 has an anode connected to a cathode of the fourth diode D4. The first diode D1 and the third diode D3 have cathodes connected to the first end of the third electrical wire LP3. The second diode D2 and the fourth diode D4 have anodes connected to the first end of the fourth electrical wire LP4.

In the full-bridge circuit 12, the first junction K1 of the first diode D1 and the second diode D2 is connected to the first end of the fifth electrical wire LP5. The second end of the fifth electrical wire LP5 is connected to the first ac terminal TA1 of the first ac terminal TA1. The second junction K2 of the third diode D3 and the fourth diode D4 is connected to the first end of the sixth electrical wire LP6. The second end of the sixth electrical wire LP6 is connected to the second ac terminal TA2.

The half-bridge circuit 15 is equipped with the fifth diode D5 and the switch SW. The switch SW is of a voltage driven type and implemented by an n-channel MOSFET in this embodiment. The fifth diode D5 has an anode connected to a drain of the switch SW. The fifth diode D5 has a cathode connected to the first end of the first electrical wire LP1. The second end of the first electrical wire LP1 is connected to the first dc terminal TD1. The switch SW has a source connected to the first end of the second electrical wire LP2. The second end of the second electrical wire LP2 is connected to the second dc terminal TD2. The switch SW is equipped with a parasitic diode reverse-connected thereto.

The third junction K3 of the fifth diode D5 and the switch SW is connected to the second end of the third electrical wire LP3. The third electrical wire LP3 has the reactor 13 disposed therein. The switch SW has a source connected to the second end of the fourth electrical wire LP4.

The capacitor 16 is arranged between the first electrical wire LP1 and the second electrical wire LP2 in electrical connection thereto.

The electrical power converter 100 is equipped with the first voltage sensor 31, the current sensor 32, and the second voltage sensor 33. The first voltage sensor 31 is connected between the first electrical wire LP1 and the second electrical wire LP2 and works to measure a terminal-to-terminal voltage developed at the capacitor 16 in the form of a DC link voltage Vdc. In this embodiment, the sign of the DC link voltage Vdc when the electrical potential at one of ends of the capacitor 16 which is closer to the first electrical wire LP1 is higher than that at the other end of the capacitor 16 which is closer to the second electrical wire LP2 is defined to be positive in electrical polarity. The current sensor 32 is arranged in the fourth electrical wire LP4 and measures electrical current flowing in the reactor 13 in the form of the reactor current Mr. The second voltage sensor 33 is connected between the fifth electrical wire LP5 and the sixth electrical wire LP6 and works to measure the voltage developed at the alternating-current source 200 in the form of the ac voltage Vac.

The electrical power converter 100 is equipped with the control apparatus 30. Functions provided by the control apparatus 30 may be achieved by software stored in a physical memory, a computer or hardware executing such software, or a combination thereof.

Figure 2:
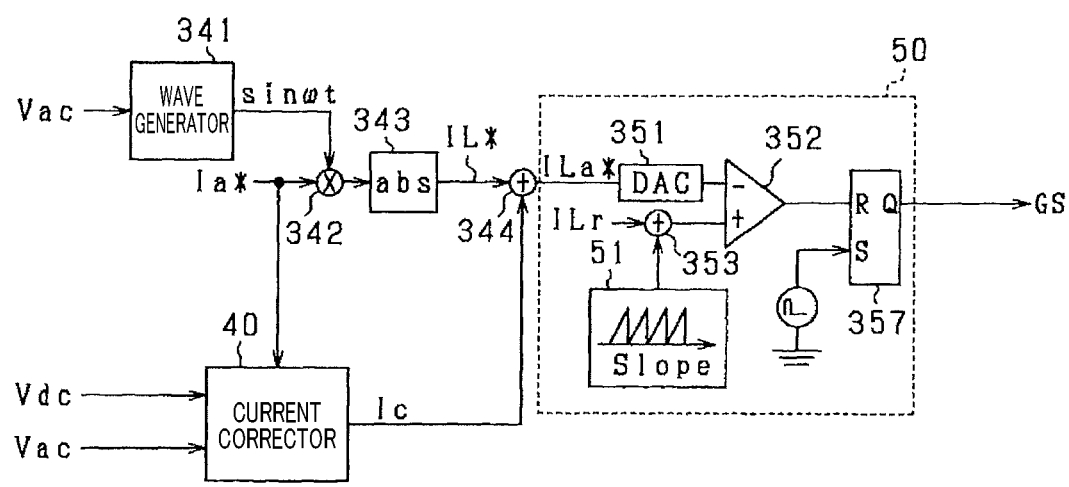
FIG. 2 is a functional block diagram which describes functions of a control apparatus.

FIG. 2 is a functional block diagraph which describes functions performed by the control apparatus 30. The control apparatus 30 works to operate the switch SW in an off-state (i.e., an open state) or an on-state (i.e., a closed state) using known peak-current mode control. In this embodiment, the control apparatus 30 includes the wave generator 341, the wave generating portion 341, the multiplier 342, the absolute value calculating portion 343, the adder 344, the current correcting portion 40, and the current controlling portion 50. In this embodiment, the wave generating portion 341, the multiplier 342, and the absolute value calculating portion 343 work as a command value calculating portion.

The wave generating portion 341 produces a reference waveform sincat indicating a change in voltage at the alternating-current source 200. The reference waveform is a value representing a change in voltage in half a cycle (T/2) at the alternating-current source 200. For instance, the wave generating portion 341 detects a point at which the ac voltage Vac, as measured by the second voltage sensor 33, becomes zero as a zero-cross time and then determines a time interval in which the ac voltage Vac changes between an adjacent two of the zero-cross times as a half cycle (T/2) in the alternating-current source 200. The wave generating portion 341 calculates an angular velocity $\omega(=2\pi\times(1/T))$ in the alternating-current source 200 using the cycle T. The wave generating portion 341 sets an angular velocity of a sine-wave signal whose amplitude is one to the calculated angular velocity $\omega$ to derive the reference waveform sincat which is in phase with the ac voltage Vac.

The multiplier 342 multiplies the amplitude command value Ia* of the reactor current ILr by the reference waveform sincat produced by the wave generating portion 341. The amplitude command value Ia* is a command value which sets an amplitude of the reactor current ILr and is determined as a function of, for example, a command value of the DC link voltage Vdc that is an output voltage. The absolute value calculating portion 343 sets an absolute value |Ia*×sinωt| of an output value of the multiplier 342 as the pre-correction command value IL*. In this embodiment, the pre-correction command current IL* corresponds to a command value for a reactor current.

The current correcting portion 40 determines the current correction value Ic for use in correcting the pre-correction command current IL*. The current correction value Ic is a correction value to minimize distortion of the ac current Iac. The adder 344 adds the current correction value Ic to an absolute value of the pre-correction command current IL* and then sets such sum as the corrected command current ILa*.

The current controlling portion 50 outputs a gate signal GS to operate the switch SW using the reactor current ILr detected by the current sensor 32 and the corrected command current ILa*. In this embodiment, the current controlling portion 50 uses known peak-current mode control to output the gate signal GS.

The current controlling portion 50 includes the DA converter 351, the comparator 352, the adder 353, the RS flip-flop 357, and the slope compensator 51. The corrected command current ILa* is changed by the DA converter 351 from digital into analog. The corrected command current ILa* that is changed into the analog value is inputted to an inverting input terminal of the comparator 352. The adder 353 adds the reactor current ILr and the slope compensating signal Slope created by the slope compensator 51. An output from the adder 353 is inputted to a non-inverting input terminal of the comparator 352. The slope compensating signal Slope is used for controlling oscillation arising from a variation in current flowing in the reactor 13.

The comparator 352 compares the corrected command current ILa* with the slope-compensated reactor current ILr and then inputs a low-level signal into a R-terminal of the RS flop-flop 357 in a period of time where the slope-compensated reactor current ILr is lower than the corrected command current ILa*. The comparator 352 inputs a high-level signal into the R-terminal of the RS flip-flop 357 in a period of time where the slope-compensated reactor current ILr is higher than the corrected command current ILa*. A clock signal is inputted into an S-terminal of the RS flip-flop 357. A time interval between when the clock signal is changed to a high level and when the clock signal is subsequently changed to the high level is one switching cycle Tsw of the switch SW.

The RS flip-flop 357 has a Q-terminal connected to the gate of the switch SW. A signal outputted from the Q-terminal to the gate is a gate signal GS.

Next, an operation of the electrical power converter 100 will be described below. When the gate signal GS is changed to the high level by the peak-current mode control performed by the current controlling portion 50, it turns on the switch SW so that the switch SW is closed, thereby creating a closed circuit including the reactor 13 and the switch SW. In the closed circuit, electrical current flows through the reactor 13, so that magnetic energy is stored in the reactor 13. When the gate signal GS is changed to the low level, it turns off the switch SW, so that the switch SW is opened, thereby causing the magnetic energy stored in the reactor 13 to create a flow of current in the first dc terminal TD1 through the fifth diode D5.

Figure 3A:
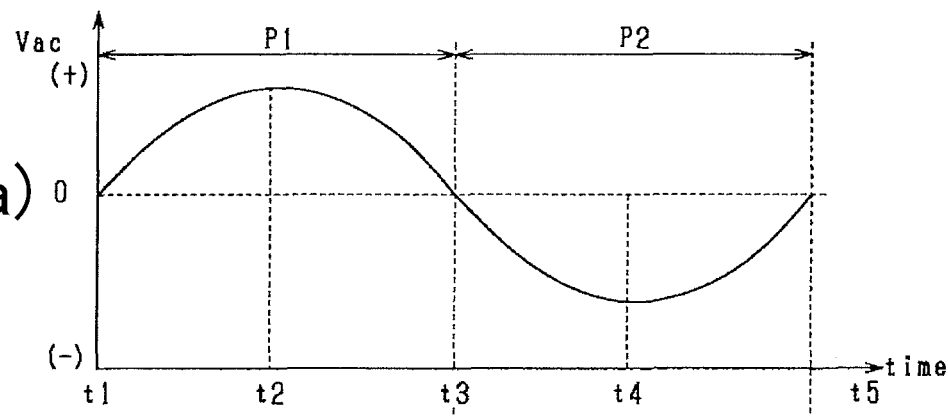
FIGS. 3(a) to 3(c) are views which demonstrate changes in ac voltage, pre-correction command value, and an average of a reactor current.
Figure 3B:
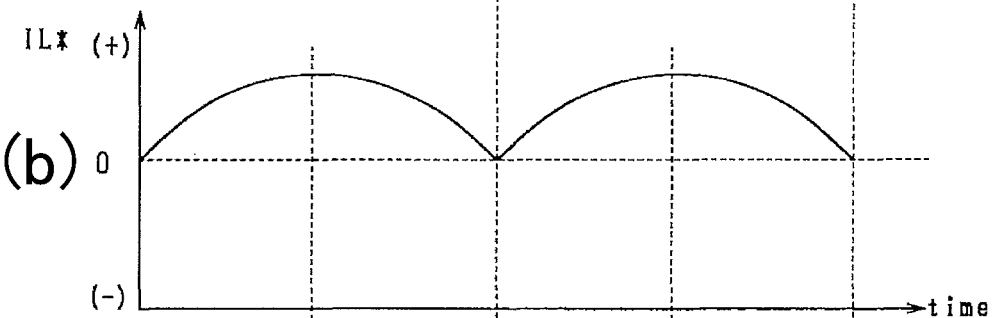

FIG. 3(a) represents a change in ac voltage Vac. FIG. 3(b) represents a change in pre-correction command current IL*.

Figure 3C:
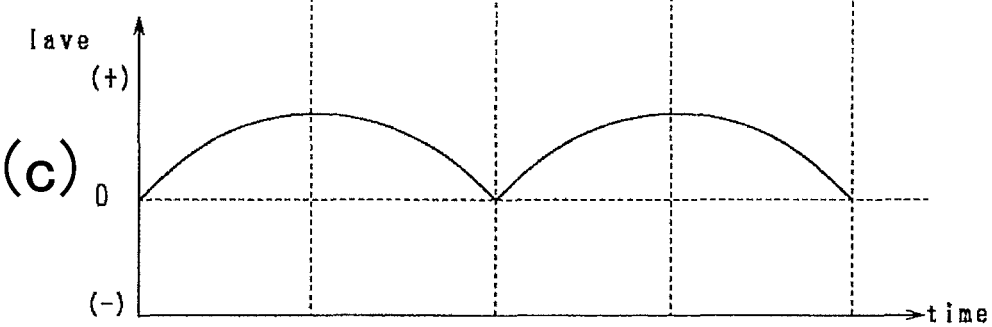

FIG. 3(c) represents a change in averaged value Lave of the reactor current ILr. In FIGS. 3(a) to 3(c), a power factor is defined as one.

The pre-correction command current IL*, as can be seen in FIGS. 3(a) and 3(b), changed synchronously with a change in ac voltage Vac in the form of a succession of positive halves of a sine wave. The averaged value Lave of the reactor current ILr with no distortion is, as demonstrated in FIG. 3(c), changed, like the pre-correction command current IL*, synchronously with the ac voltage Vac in the form of a succession of positive halves of a sine wave.

Usually, the reactor current ILr sometimes has a distortion, thereby causing the averaged value Lave to be different in waveform from that in FIG. 3(c). An undesirable value of the reactor current ILr in the peak-current mode control will result in distortion of the ac current Iac. The control apparatus 30, therefore, corrects the pre-correction command current IL* using the current correction value Ic to minimize the distortion of the ac current Iac.

Specifically, when the ac voltage Vac is converted into the DC link voltage Vdc, a deviation that is a difference between the averaged value Lave of the distorted reactor current ILr and the pre-correction command current IL* is maximized near the zero-cross time (t1, t3, or t5). The deviation is also minimized near the peak time (t2 or t4) of the ac voltage Vac. The current correction value Ic is, therefore, determined as a function of the deviation to increase the reactor current ILr near the zero-cross time.

The DC link voltage Vdc applied to the reactor 13 may be varied. A variation in the DC link voltage Vdc results in a variation in the reactor current ILr, which leads to concern about an increase in distortion of the ac current Iac.

A variation in the DC link voltage Vdc depends upon the amplitude of the ac voltage Vac. The variation in the DC link voltage Vdc results in a variation in the reactor current ILr. A cycle of variation in the DC link voltage Vdc, therefore, correlates with a cycle of variation in the reactor current ILr. For instance, in the AC-DC converter 10, a frequency of variation in the DC link voltage Vdc is known to be twice that of the ac voltage Vac (see "DC voltage control of single-phase PFC converter and harmonic current control" in the transactions of the Institute of Electrical Engineers D, Vol. 121. Tenth issue, 2001, pp.1041-1-48 written by Takaharu Takeshita). From the above relation, the inventor of this application has found that the distortion of the ac current Iac is reduced by selecting the current correction value Ic as a function of a variation in DC link voltage Vdc using the ac voltage Vac. The above document teaches that the varying DC link voltage Vdc has a value as a function of an electrical current flowing in the AC-DC converter 10. Accordingly, the control apparatus 30 in this embodiment is designed to use the ac voltage Vac and the amplitude command value Ia* indicating the amplitude of the reactor current ILr to determine the current correction value Ic which contains a component of a variation in DC link voltage Vdc.

Figure 4:
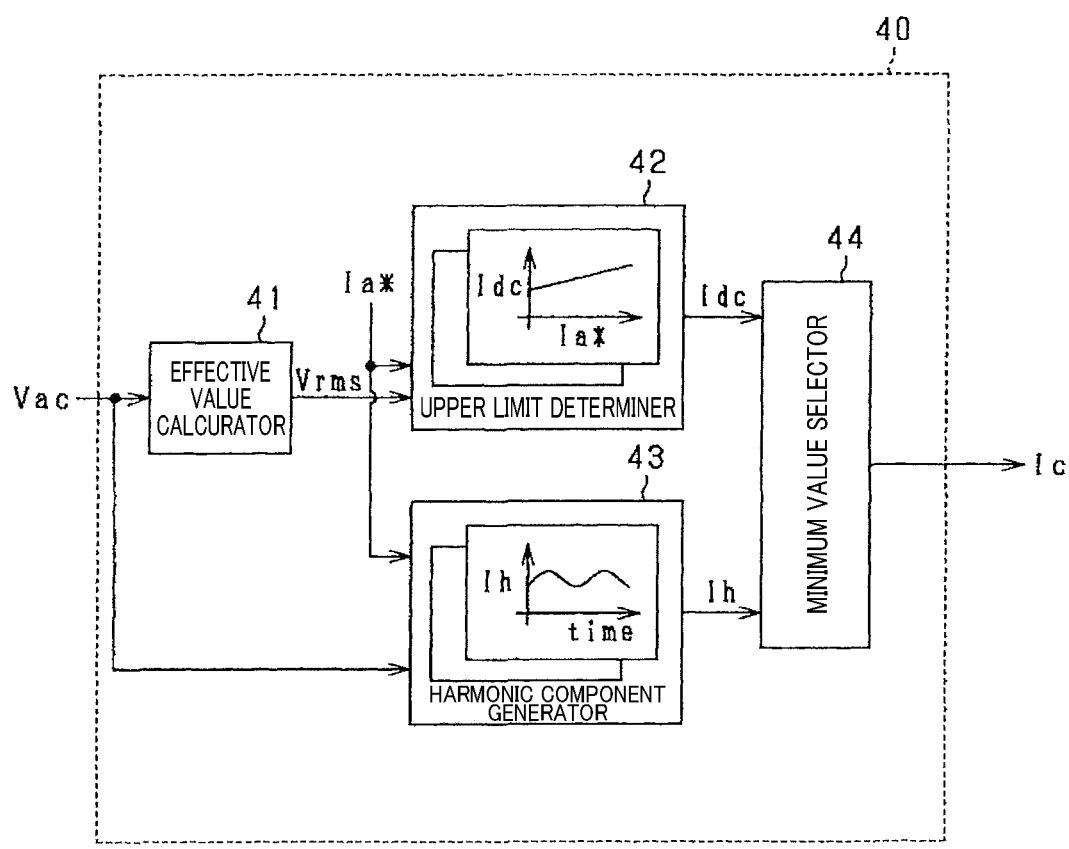
FIG. 4 is a structural view which illustrates a current correcting portion.

Next, the structure of the current correcting portion 40 in this embodiment will be described below. The current correcting portion 40, as illustrated in FIG. 4, includes the effective value calculating portion 41, the upper limit determining portion 42, the harmonic component generating portion 43, and the minimum value selecting portion 44.

The effective value calculating portion 41 calculates the effective value Vrms of the alternating-current source 200 using the ac voltage Vac.

The upper limit determining portion 42 determines the upper limit Idc using the effective value Vrms and the amplitude command value Ia*. The upper limit determining portion 42 in this embodiment determines the upper limit Idc which is increased with an increase in the amplitude command value Ia* based on the fact that the greater the amplitude command value Ia*, the greater an increase in reactor current ILr will be.

The control apparatus 30 is equipped with a storage portion, such as a memory, which retains therein a dc component map representing information which specifies values of the upper limit Idc in relation to the respective effective values Vrms and the respective amplitude command values Ia*. For instance, the respective effective values Vrms correspond to effective values Vrms of commercial power supplies in respective countries. The upper limit determining portion 42, therefore, looks up the dc component map to determine the upper limit Idc corresponding to the effective value Vrms and the amplitude command value Ia*. A parameter used in the upper limit determining portion 42 may be selected as an amplitude of the ac voltage Vac instead of the effective value Vrms of the ac voltage Vac.

The harmonic component generating portion 43 determines the harmonic correction value Ih using the amplitude command value Ia* and the ac voltage Vac. FIGS. 5(a) to 5(c) are views which represent changes in the ac voltage Vac, the DC link voltage Vdc, and the harmonic correction value Ih in this embodiment. In FIGS. 5(a) to 5(c), the DC link voltage Vdc changes at a frequency twice that of the ac voltage Vac. Specifically, the DC link voltage Vdc changes to have a minimum value both in the first half P11 of the first time period P1 in which the ac voltage Vac is positive in electrical polarity and in the first half P21 of the second period of time P2 in which the ac voltage Vac is negative in electrical polarity. Subsequently, the DC link voltage Vdc changes to have a maximum value both in the second halves P12 and P22 in the first and second time periods P1 and P2. In FIG. 5(c), the harmonic correction value Ih becomes large from a dotted line, to a short dashed line, and to a solid line. In the following discussion, the DC link voltage Vdc which is higher than an averaged value thereof will be referred to as being positive, while the DC link voltage Vdc which is lower than the averaged value will be referred to as being negative. Specifically, in FIG. 5(b), the DC link voltage Vdc is positive in the time periods P12 and P22 in which the DC link voltage Vdc is higher than the averaged value. The DC link voltage Vdc is negative in the time periods P11 and P21 in which the DC link voltage Vdc is lower than the averaged value.

The harmonic component generating portion 43 sets the harmonic correction value Ih to have a single maximum value in each of the time periods P12, P22 in which the DC link voltage Vdc is positive in electrical polarity and each of the time periods P11 and P21 in which the DC link voltage Vdc is negative in electrical polarity and also have a single minimum value between the maximum value in each time period in which the DC link voltage Vdc is positive and the maximum value in one of the time periods in which the DC link voltage Vdc is negative. The harmonic component generating portion 43 also determines the harmonic correction value Ih at the zero-cross time of the DC link voltage Vdc not to depend upon the magnitude of the amplitude command value Ia*. Specifically, the harmonic component generating portion 43 fixes the harmonic correction value Ih to the same value at each downward zero crossing time when the DC link voltage Vdc changes from positive to negative regardless of the magnitude of the amplitude command value Ia*. The harmonic component generating portion 43 also fixes the harmonic correction value Ih to the same value at each upward zero crossing time when the DC link voltage Vdc changes from negative to positive regardless of the magnitude of the amplitude command value Ia*.

The greater the amplitude of the ac current Jac, the greater a deviation of the DC link voltage Vdc from an average value thereof will be. The harmonic component generating portion 43, therefore, decreases the harmonic correction value Ih with an increase in the amplitude command value Ia* in the time periods P11 and P21 in which the DC link voltage Vdc is negative. The harmonic component generating portion 43 also increases the harmonic correction value Ih with an increase in the amplitude command value Ia* in the time periods P12 and P22 in which the DC link voltage Vdc is positive.

The harmonic component generating portion 43 determines the harmonic correction value Ih to shorten a length of time from when the DC link voltage Vdc drops and crosses zero (i.e., a downward zero crossing time) to when the harmonic correction value Ih has the maximum value or the minimum value with an increase in the amplitude command value Ia*. FIG. 5(c) demonstrates an example of the harmonic correction value Ih corresponding to each of three different amplitude command values Ia*. FIG. 5(c) illustrates, as an example, the time period T1 in which the amplitude command value Ia* is greater and the time period T2 when the amplitude command value Ia* is smaller as a time period from when the DC link voltage Vdc decreases and crosses zero to when the harmonic correction value Ih becomes minimized. The time period T1 corresponding to the greater amplitude command value Ia* is shorter than the time period T2 corresponding to the smaller the amplitude command value Ia*. The same is true for the maximum value of the harmonic correction value Ih. Specifically, a time period corresponding to the greater amplitude command value Ia* is shorter than a time period corresponding to the smaller amplitude command value Ia*.

In this embodiment, the storage portion of the control apparatus 30 retains therein a correction map representing information which specifies the harmonic correction values Ih in relation to the respective amplitude command values Ia* and respective values of the ac voltage Vac. The harmonic component generating portion 43, therefore, looks up the correction map to determine the harmonic correction value Ih as a function of the amplitude command value Ia* and the ac voltage Vac.

When the harmonic correction value Ih determined by the harmonic component generating portion 43 is lower than the upper limit Idc set by the upper limit determining portion 42, the minimum value selecting portion 44 sets the harmonic correction value Ih directly as the current correction value Ic. Alternatively, when the harmonic correction value Ih is higher than or equal to the upper limit Idc, the minimum value selecting portion 44 sets the upper limit Idc as the current correction value Ic.

How to make the correction map which represents the correspondence relation between the amplitude command value Ia* and the harmonic correction value Ih will be described below using FIG. 6.

FIG. 6 is a view which describes the deviation $\Delta i$. In this embodiment, the deviation $\Delta i$ is defined as a difference between the averaged value Lave of the reactor current ILr and the pre-correction command current IL*. Therefore, if a maximum increase in the reactor current ILr in one switching cycle Tsw is defined as $\Delta IL$, the deviation $\Delta i$ will be the sum of a difference between the averaged value Lave and the maximum increase $\Delta IL$ (=$\Delta IL/2$) and the maximum increase $\Delta$Slope in the slope compensating signal Slope. In this embodiment, the deviation $\Delta i$ is determined as the harmonic correction value Ih. The harmonic correction value Ih is calculated according to the following equation (1) using an inclination mb of the increasing reactor current ILr and the slope ms. In Eq. (1), "D" indicates a duty cycle.

$$Ih = mb \cdot D \cdot Tsw/2 + ms \cdot D \cdot Tsw \quad (1)$$

The inclination mb when the reactor current ILr is increasing meets a relation of mb=Vac/L. By substituting such a relation into the above Eq. (1), the harmonic correction value Ih is derived according to equation (2) below.

[Number 1]

$$Ih = \frac{|Vac|}{2L} \cdot D \cdot Tsw + ms \cdot D \cdot Tsw \quad (2)$$

When the electrical power converter 100 converts ac voltage into dc voltage, the duty cycle D may be derived according to the following equation (3) where Vdc* is the DC link voltage when it is not fluctuating. For instance, Vdc* is an averaged value of a terminal-to-terminal voltage at the capacitor 16.

[Number 2]

$$D = 1 - \frac{|Vac|}{Vdc^*} \quad (3)$$

The DC link voltage Vdc when the terminal-to-terminal voltage at the capacitor 16 fluctuates is given according to the following equation (4) where θ represents a phase of the ac voltage Vac, f represents a frequency of the ac voltage Vac, and C indicates an electrostatic capacitance of the capacitor 16.

[Number 3]

$$Vdc = Vdc^* - \frac{Vac \cdot Ia^*}{4\pi \cdot f \cdot Vdc^* \cdot C} \cdot \sin 2\theta \quad (4)$$

The duty cycle D which takes a variation in the DC link voltage Vdc into account is, therefore, derived according to the following equation (5) in which Vdc* in Eq. (3) is replaced with a right side in Eq. (4).

[Number 4]

$$D = 1 - \frac{|Vac|}{Vdc^* - \frac{Vac \cdot Ia^*}{4\pi \cdot f \cdot Vdc^* \cdot C} \cdot \sin 2\theta} \quad (5)$$

This embodiment uses Eqs. (2) and (5) to calculate the harmonic correction values Ih as a function of the amplitude command values Ia* and the ac voltages Vac. Each of the harmonic correction values Ih calculated in this way is combined with corresponding ones of the amplitude command values Ia* and the ac voltages Vac to make the correction map.

Figure 7:
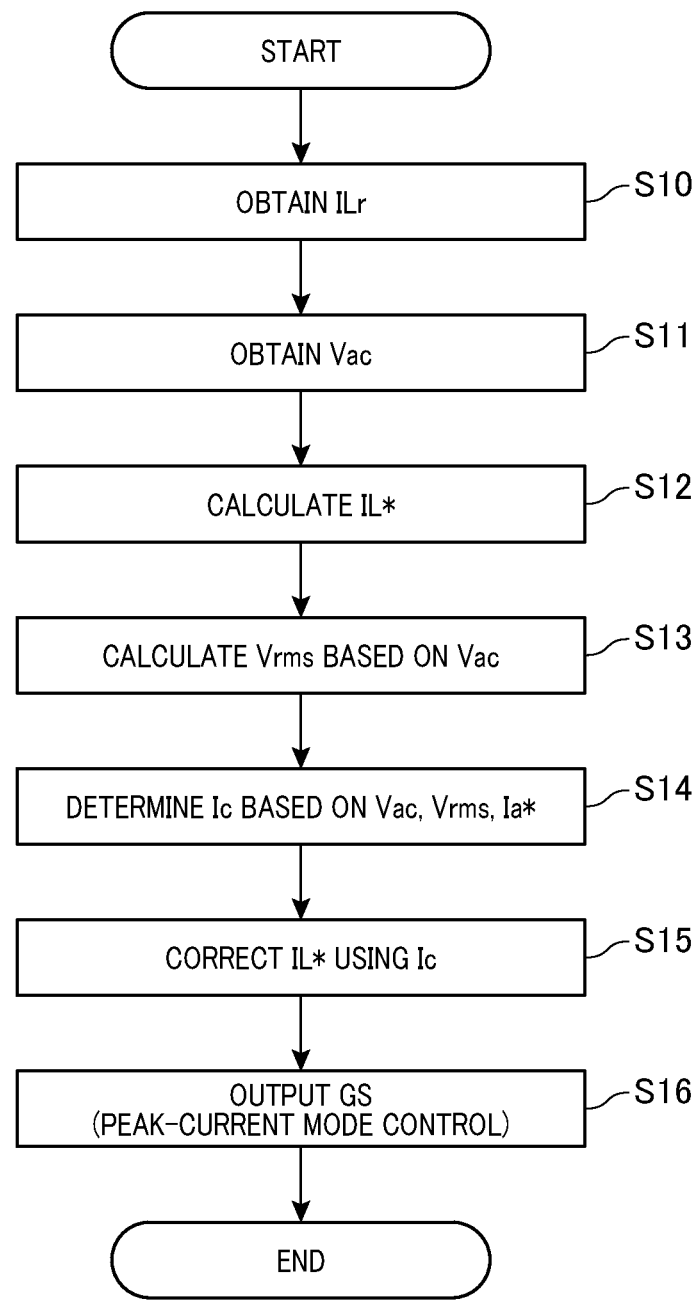
FIG. 7 is a flowchart which represent a sequence of operations of switches in peak-current mode control.

A sequence of operations for the switch SW using the peak-current mode control will be described below with reference to FIG. 7. The operations in FIG. 7 are performed by the control apparatus 30 cyclically at given intervals.

In step S10, the reactor current ILr measured by the current sensor 32 is obtained. Step S10 corresponds to a current obtaining portion. In step S11, the ac voltage Vac measured by the second voltage sensor 33 is obtained. Step S11 corresponds to an ac voltage obtaining portion.

In step S12, the amplitude command value Ia* is multiplied by the reference waveform sincat of the ac voltage Vac. An absolute value of such a product is calculated as the pre-correction command current IL*. Step S12 corresponds to the command value calculating portion.

In step S13, the effective value Vrms of the alternating-current source 200 is calculated using the ac voltage Vac. In step S14, the current correction value Ic is, as illustrated in FIG. 4, determined using the ac voltage Vac, the effective value Vrms, and the amplitude command value Ia*.

In step S15, the current correction value Ic derived in step S14 is added to the pre-correction command current IL* to determine the corrected command current ILa*.

In step S16, the gate signal GS which is, as already described with reference to FIG. 2, used in performing the peak-current mode control is outputted based on the corrected command current ILa*. This adjusts the reactor current ILr to the corrected command current ILa* derived in step S15, thereby causing the reactor current ILr that is the distortion-reduced ac current Jac to flow in the reactor 13. After completion of the operation in step S16, the routine terminates.

Next, operations and beneficial advantages in this embodiment will be described below with reference to FIGS. 8(a) to 8(f) and FIGS. 9(a1) to (c2).

Figure 8:
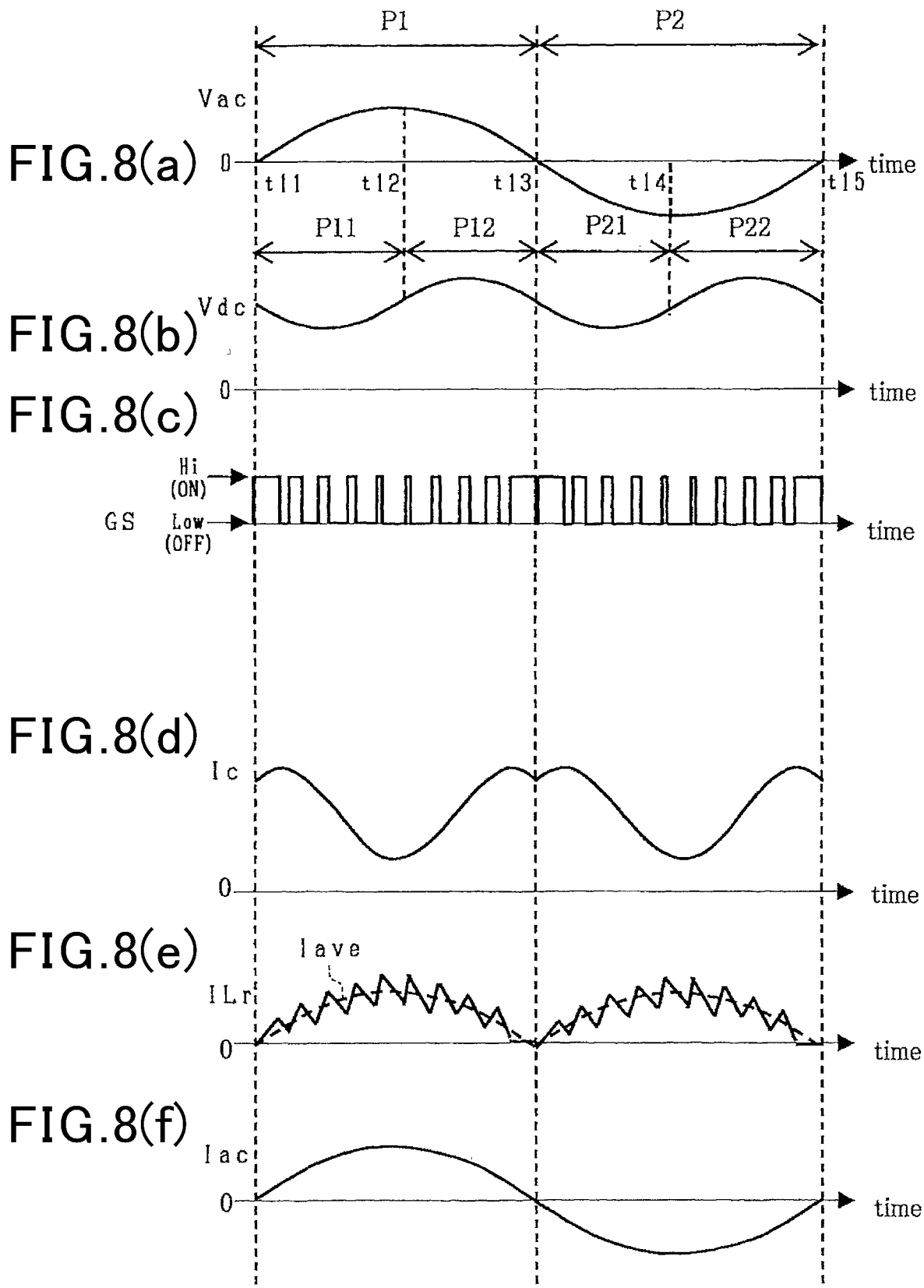
FIGS. 8(a) to 8(f) are time charts for an electrical power converter.

FIG. 8(a) demonstrates a change in ac voltage Vac. FIG. 8(b) demonstrates a change in DC link voltage Vdc. FIG. 8(c) demonstrates a change in gate signal GS. FIG. 8(d) demonstrates a change in current correction value Ic. FIG. 8(e) demonstrates a change in reactor current ILr. FIG. 8(f) demonstrates a change in ac current Iac. The current correction value Ic in FIG. 8(d) is a value when the harmonic correction value Ih is lower than the upper limit Idc, and thus identical with the harmonic correction value Ih. Times t11, t13, and t15 in FIG. 8(a) represent the zero-cross time of the ac voltage Vac. Times t12 and t14 represent times when the ac voltage Vac has a positive peak and a negative peak, respectively.

The current correction value Ic changes to have a maximum value near time t11 in the time period P11 in which the DC link voltage Vdc is negative and then have a minimum value at time t12. The current correction value Ic changes to have a maximum value near time t13 in the time period P12 in which the DC link voltage Vdc is positive. The current correction value Ic also changes in the time period P21 in which the DC link voltage Vdc is positive and the time period P22 in which the DC link voltage Vdc is negative in the same ways in the time periods P11 and P12.

In a relation to a change in the ac voltage Vac, the current correction value Ic changes to have the maximum value near the zero-cross times t11, t13, and t15 of the ac voltage Vac in the first and second time periods P1 and P2 and have the minimum value near the peak times t12 and t14. The duty cycle D of the gate signal GS is, therefore, greater than when the current correction value Ic is kept constant at the zero-cross time of the ac voltage Vac when the deviation Δi is maximized. In contrast, the duty cycle D of the gate signal GS is smaller than when the current correction value Ic is kept constant at the peak time when the deviation Δi is low. The current correction value Ic is changed with a change in the DC link voltage Vdc, thereby causing the duty cycle D of the gate signal GS to be adjusted as a function of a change in the DC link voltage Vdc. This results in the ac current Iac having reduced distortion in the form of a sine wave.

Figure 9:
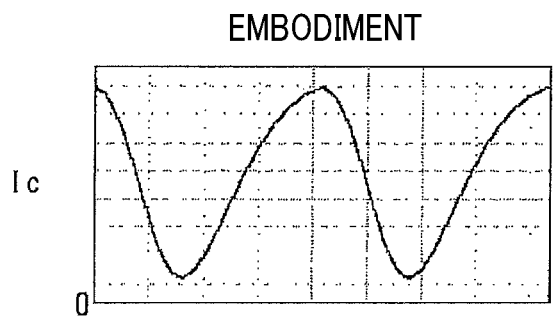
FIGS. 9(a1) to 9(c2) are views which represent beneficial advantages provided by the embodiment.
Figure 9:
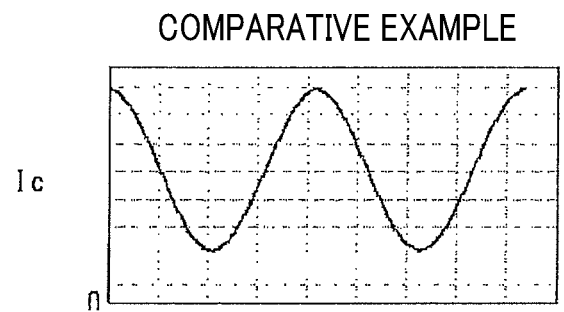
Figure 9:
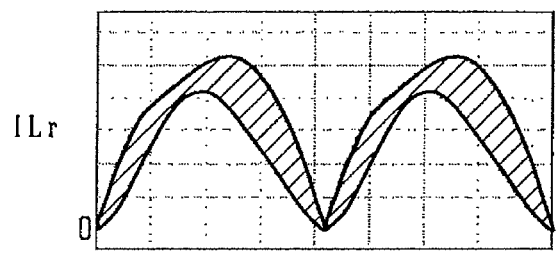
Figure 9:
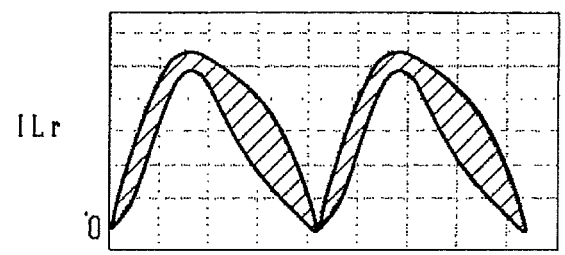
Figure 9:
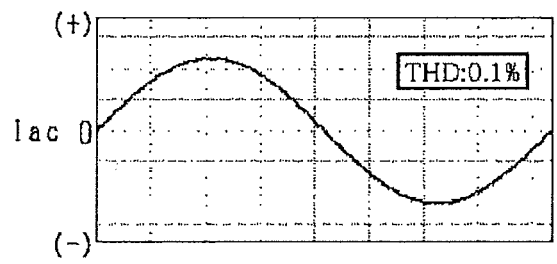
Figure 9:
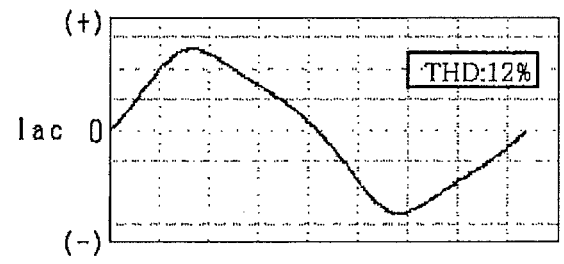

FIGS. 9(a1), 9(b1), and 9(c1) are views which demonstrate changes in the current correction value Ic, the reactor current ILr, and the ac current Iac in this embodiment. FIGS. 9(a2), 9(b2), and 9(c2) are views which demonstrate changes in the current correction value Ic, the reactor current ILr, and the ac current Iac in a comparative example. The current correction value Ic in the comparative example is determined as a function of a change in the ac voltage Vac regardless of a change in the DC link voltage Vdc.

In the comparative example, the reactor current ILr illustrated in FIG. 9(b2) flows in the reactor 13 in the peak-current mode control using the current correction value Ic illustrated in FIG. 9(a2). This, as illustrated in FIG. 9(c2), results in distortion of the ac current Iac. In the comparative example, a total distortion percentage THD of the ac current Iac is 12%. In contrast, the current correction value Ic illustrated in FIG. 9(a1) is determined as a function of a change in the DC link voltage Vdc as well as a change in the ac voltage Vac. The reactor current ILr illustrated in FIG. 9(b1) flows in the reactor 13 in the peak-current mode control using the current correction value Ic illustrated in FIG. 9(a1). This, as illustrated in FIG. 9(c1), results in a reduction in distortion of the ac current Iac as compared with the ac current Iac illustrated in FIG. 9(c2). For instance, the total distortion percentage of the ac current Iac is, as illustrated in FIG. 9(c1), 0.1%.

The above described embodiment offers the following beneficial advantages.

The control apparatus 30 works to operate the switch SW in the peak-current mode control to bring the reactor current ILr into agreement with the corrected command current ILa* to which the current correction value Ic is added. Specifically, the control apparatus 30 sets the current correction value Ic to a value including a component of fluctuation in the DC link voltage Vdc based on the ac voltage Vac. The current correction value Ic is set to a value as a function of a change in the reactor current ILr arising from a change in the DC link voltage Vdc, thereby minimizing the distortion of the ac current Iac.

The control apparatus 30 determines a current correction value which has a single maximum value in each of a period of time in which the DC link voltage Vdc is positive and a period of time in which the DC link voltage Vdc is negative and also has a single minimum value between the maximum values in the periods of time in which the DC link voltage Vdc is positive and negative. The current correction value Ic is set to a value as a function of a change in the reactor current ILr resulting from a change in the DC link voltage Vdc and also as a function of a change in the deviation ΔI, thereby enhancing the reduction in distortion of the ac current Iac.

The control apparatus 30 calculates the pre-correction command current IL* as a function of the ac voltage Vac and the amplitude command value Ia*. The control apparatus 30 determines the current correction value Ic to become smaller with an increase in the amplitude command value Ia* in a period of time in which the DC link voltage Vdc is negative. The control apparatus 30 also determines the current correction value Ic to become greater with an increase in the amplitude command value Ia* in a period of time in which the DC link voltage Vdc is positive. In this case, the current correction value Ic is increased or decreased according to a changing tendency of the DC link voltage Vdc arising from increase or decrease in the ac voltage Vac, thereby resulting in a greater decrease in distortion of the ac current Iac.

Second Embodiment

The second embodiment will be referred to in terms of arrangements different from those in the first embodiment. Structural elements to which the same reference symbols as in the first embodiment are assigned are the same as those in the first embodiment, and explanation thereof in detail will be omitted here.

This embodiment is different in circuit topology of the electrical power converter 100 from that in the first embodiment. Specifically, the electrical power converter 100 in this embodiment is, unlike the first embodiment, not equipped with a half bridge circuit.

Figure 10:
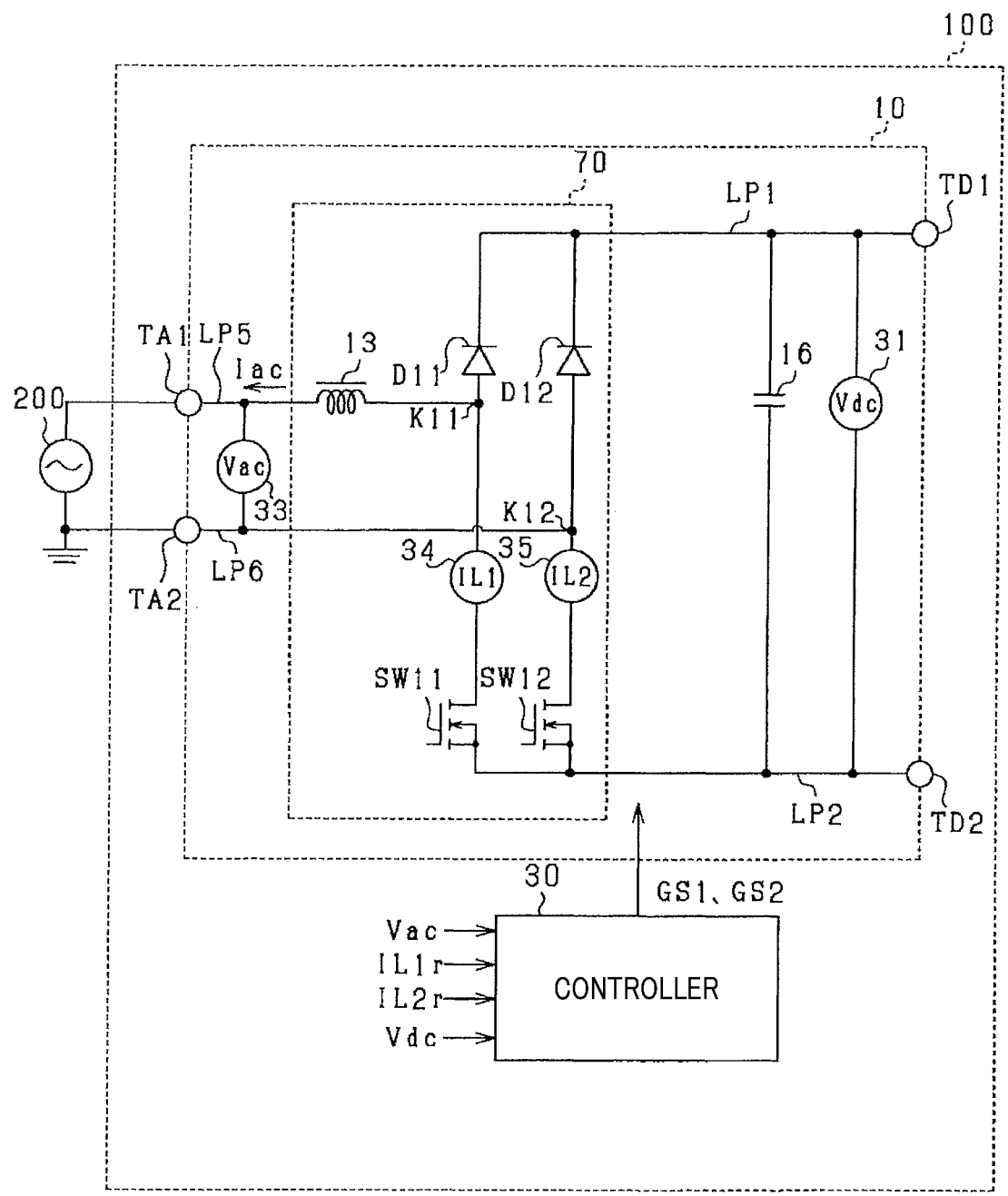
FIG. 10 is a structural view which an electrical power converter in the second embodiment.

FIG. 10 is a view which illustrates the electrical power converter 100 according to the second embodiment. The first dc terminal TD1 and the full-bridge circuit 70 are connected together through the first electrical wire LP1. The second dc terminal TD2 and the full-bridge circuit 70 are connected together through the second electrical wire LP2.

The full-bridge circuit 70 is equipped with the first switch SW11, the first switch SW12, and the first and second diodes D11 and D12. The first and second switches SW11 and SW12 are of a voltage driven type and each implemented by an n-channel MOSFET. The first diode D11 has an anode connected to a drain of the first switch SW11. The second diode D11 has an anode connected to a drain of the first switch SW12. Each of the first and second diodes D11 and D12 has a cathode connected to the first electrical wire LP1. Each of the first and second switches SW11 and SW12 has a source connected to the second electrical wire LP2. Each of the first and second switches SW11 and SW12 is equipped with a parasitic diode reverse-connected thereto.

The first junction K11 of the first diode D11 and the first switch SW is connected to the first end of the fifth electrical wire LP5. The second end of the fifth electrical wire LP5 is connected to the first ac terminal TA1. The second junction K12 of the second diode D11 and the first switch SW12 is connected to the first end of the sixth electrical wire LP6. The second end of the sixth electrical wire LP6 is connected to the second ac terminal TA2.

The first current sensor 34 is arranged between the anode of the first diode D11 and the drain of the first switch SW11. The first current sensor 34 measures electrical current flowing in the first switch SW11 as the first reactor current IL1r. The second current sensor 35 is disposed between the anode of the second diode D11 and the drain of the first switch SW12. The second current sensor 35 measures electrical current flowing in the first switch SW12 as the second reactor current IL2r.

Figure 11:
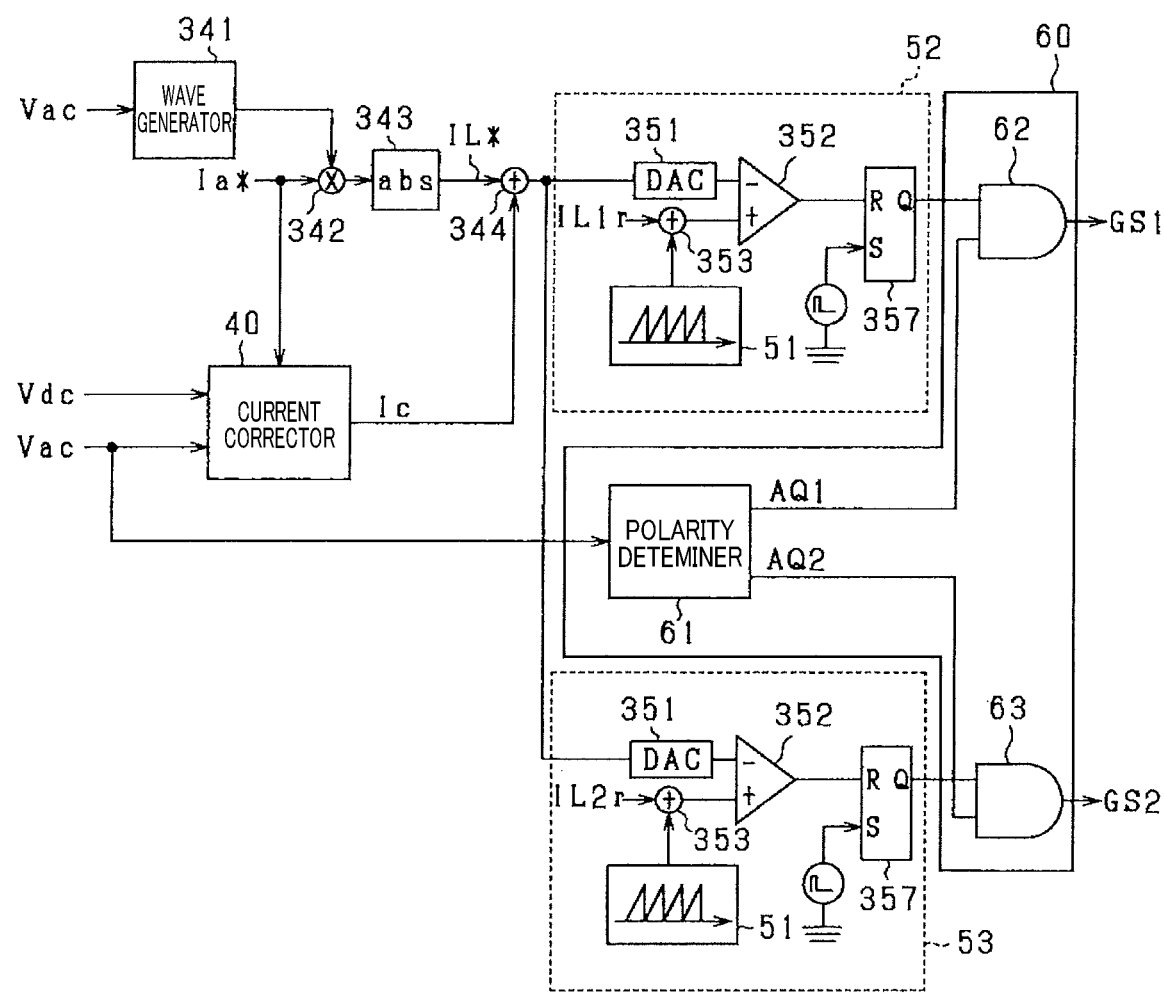
FIG. 11 is a functional block diagram of a control apparatus.

FIG. 11 is a functional block diagram which illustrates functions performed by the control apparatus 30 in the second embodiment. The control apparatus 30 includes the first current controlling portion 52, the second current controlling portion 53, and the switching portion 60. In this embodiment, the control apparatus 30 works to operate the first and second switches SW11 and SW12 in the peak-current mode control to bring the reactor current ILr after a slope or gradient is compensated for into agreement with the corrected command current ILa*.

The first current controlling portion 52 works to perform the peak-current mode control to bring the first reactor current IL1r whose slope has been compensated for into agreement with the corrected command current ILa*. The second current controlling portion 53 works to perform the peak-current mode control to bring the second reactor current IL2r after the slop is compensated for into agreement with the corrected command current ILa*. Each of the first and second current controlling portions 52 and 53 has the same structure as that of the current controlling portion 50, and explanation thereof in detail will be omitted here.

The switching portion 60 works to switch between output of the first gate signal GS1 and the second gate signal GS2 according to the electrical polarity of the ac voltage Vac. The switching portion 60 includes the polarity determining portion 61, the first AND circuit 62, and the second AND circuit 63. The polarity determining portion 61 has output terminals connected to input terminals of the first and second AND circuits 62 and 63. The first AND circuit 62 has another input terminal connected to the output terminal of the first current controlling portion 52. The second AND circuit 63 has another input terminal connected to the output terminal of the second current controlling portion 53.

When determining the ac voltage Vac as being positive in polarity, the polarity determining portion 61 changes the first switching signal AQ1 to a high level and outputs it to the first AND circuit 62 and also changes the second switching signal AQ2 to a low level and outputs it to the second AND circuit 63. Alternatively, when determining the ac voltage Vac as being negative in polarity, the polarity determining portion 61 changes the first switching signal AQ1 to the low level and outputs it to the first AND circuit 62 and also changes the second switching signal AQ2 to the high level and outputs it to the second AND circuit 63.

The first AND circuit 62 is connected to the gate of the first switch SW1 and outputs the first gate signal GS1 for opening or closing the first switch SW1. The second AND circuit 63 is connected to the gate of the second switch SW2 and outputs the second gate signal GS2 for opening or closing the second switch SW2.

Figure 12:
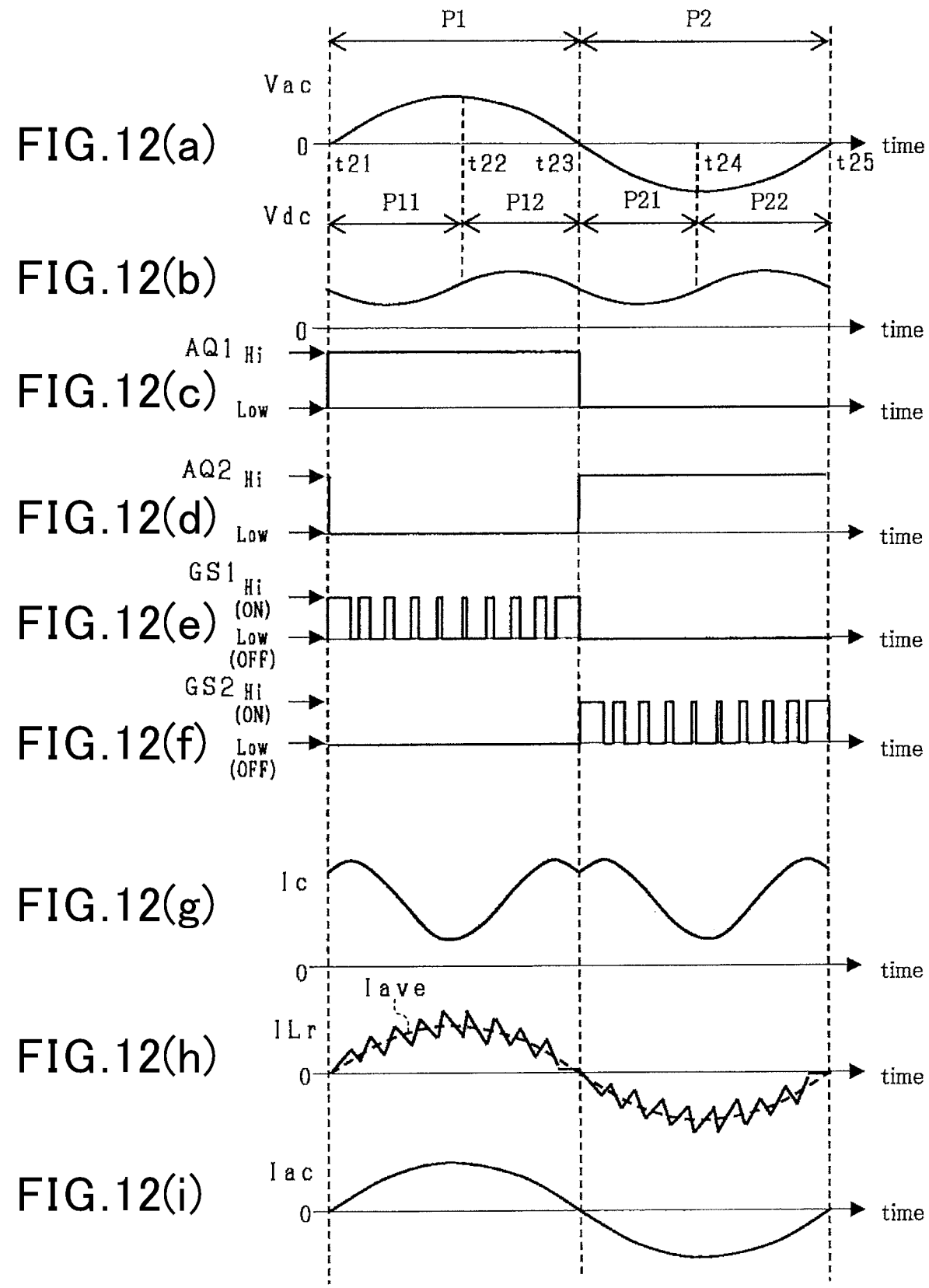
FIGS. 12(a) to 12(i) are time charts for an electrical power converter.

FIGS. 12(a) to 12(i) are time charts for the electrical power converter 100 in this embodiment. FIG. 12(a) demonstrates a change in the ac voltage Vac. FIG. 12(b) demonstrates a change in the DC link voltage Vdc. FIG. 12(c) demonstrates a change in the first switching signal AQ1. FIG. 12(d) demonstrates a change in the second switching signal AQ2. FIG. 12(e) demonstrates a change in the first gate signal GS1. FIG. 12(f) demonstrates a change in the second gate signal GS2. FIG. 12(g) demonstrates a change in the current correction value Ic. FIG. 12(h) demonstrates a change in the reactor current ILr. FIG. 12(i) demonstrates a change in the ac current Iac. The current correction value Ic in FIG. 12(g) is a value when the harmonic correction value Ih is lower than the upper limit Idc and identical with the harmonic correction value Ih. Times t21, t23, and t25 in FIG. 12(a) represent the zero-cross times of the ac voltage Vac. Times t22 and t24 represent peak times when the ac voltage Vac has a positive and a negative peak, respectively.

In the first time period P1 when the ac voltage Vac is positive in electrical polarity, the first switching signal AQ1 is at the high level, while the second switching signal AQ2 is at the low level, thereby causing the first switch SW1 to be operated in the peak-current mode control executed by the first current controlling portion 52.

In the first time period P1, the current correction value Ic changes with a change in the DC link voltage Vdc. The current correction value Ic changes to have a maximum value near time t21 in the time period P11 when the DC link voltage Vdc is negative and then have a minimum value at time t22. The current correction value Ic also changes to have the maximum value near time t23 in the time period P12 when the DC link voltage Vdc is positive. In a relation to a change in the ac voltage Vac, the current correction value Ic, therefore, changes to have the maximum value near the zero-cross times t21 and t23 and also have the minimum value at the peak time t22. Therefore, at each zero-cross time in the first time period P1, the duty cycle of the first gate signal GS1 is higher than that when the current correction value Ic is kept constant, thereby reducing the distortion of the ac current Iac.

In the second time period P2 when the ac voltage Vac is negative, the first switching signal AQ1 is at the low level, while the second switching signal AQ2 is at the high level. This causes the second switch SW2 to be operated in the peak-current mode control executed by the second current controlling portion 53.

In the second time period P2, the current correction value Ic changes with a change in the DC link voltage Vdc. The current correction value Ic changes to have the maximum value near time t23 in the time period P21 when the DC link voltage Vdc is negative and then have the minimum value at time t24. The current correction value Ic also changes to have the maximum value near time t25 in the time period P22 when the DC link voltage Vdc is positive. In a relation to a change in the ac voltage Vac, the current correction value Ic, therefore, changes to have the maximum value near the zero-cross times t23 and t25 of the ac voltage Vac in the second time period P2 and also have the maximum value at the peak time t24. The duty cycle of the second gate signal GS2 at each zero-cross time in the second time period P2 is, therefore, higher than that when the current correction value Ic is kept constant, thereby reducing the distortion of the ac current Iac.

The above described embodiment offers the same beneficial advantages as in the first embodiment.

First Modification of the Second Embodiment

Figure 13:
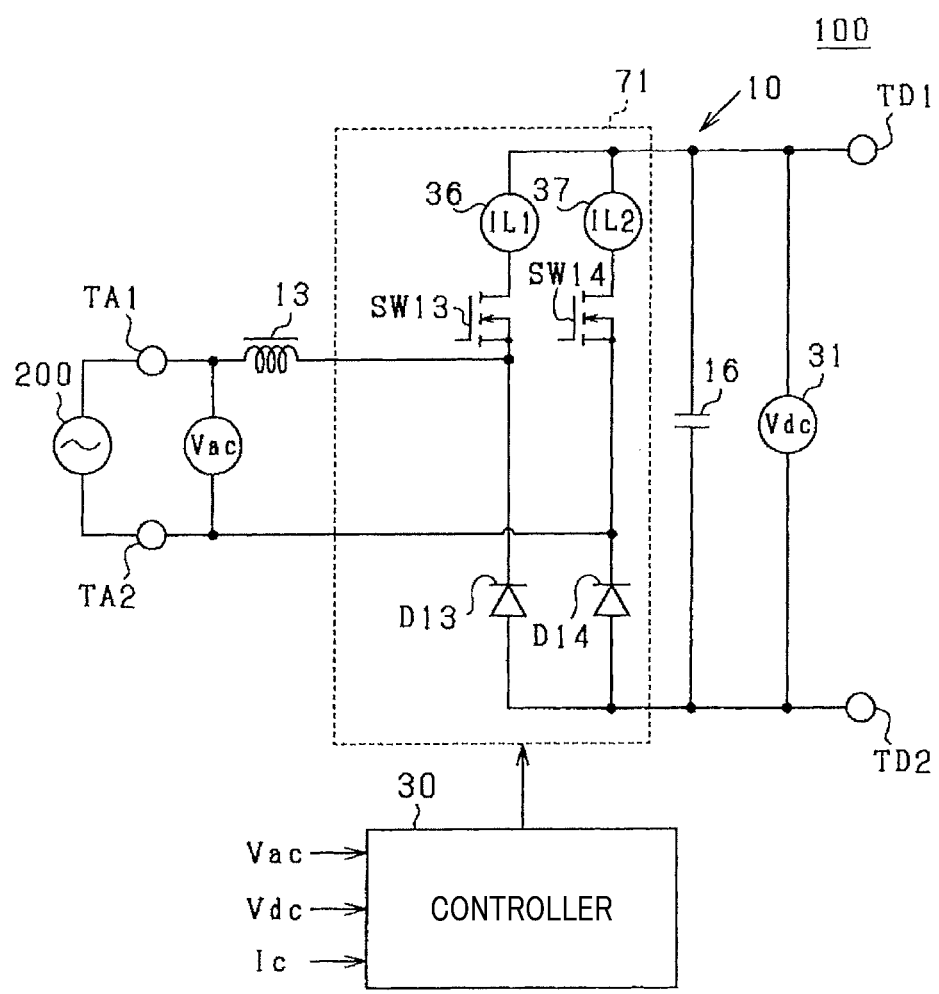
FIG. 13 is a structural view of an electrical power converter in a modified form of the second embodiment.

This embodiment is, as illustrated in FIG. 13, different in topology of the full-bridge circuit 71 from the first embodiment. In the full-bridge circuit 71, the first switch SW13 has a source connected to a cathode of the first diode D13. A source of the second switch SW14 is connected to a cathode of the second diode D14. The first current sensor 36 is connected to a drain of the first switch SW13 and works to measure electrical current flowing in the first switch SW13 as the first reactor current IL1r. The second current sensor 37 is connected to a drain of the second switch SW14 and works to measure electrical current flowing in the second switch SW14 as the second reactor current IL2r.

Second Modification of the Second Embodiment

Figure 14:
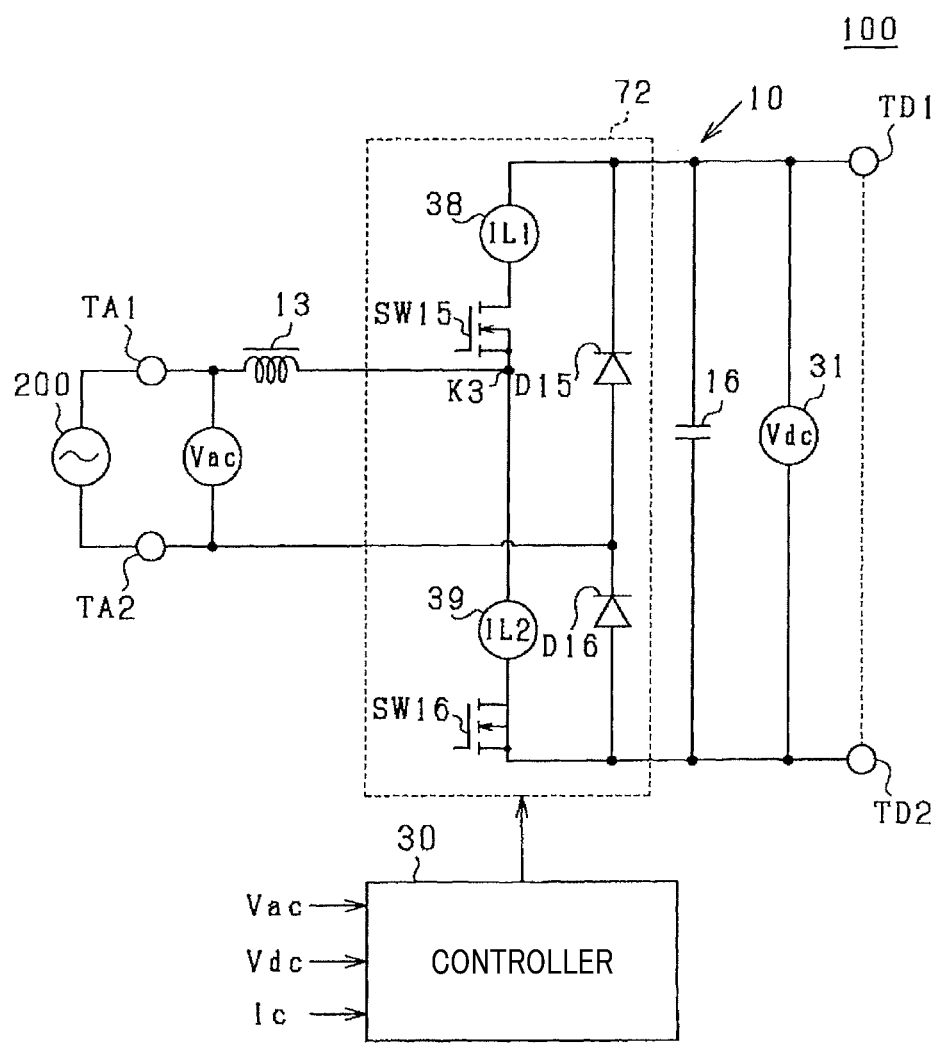
FIG. 14 is a structural view of an electrical power converter in a modified form of the second embodiment.

This embodiment is, as clearly illustrated in FIG. 14, different in topology of the full-bridge circuit 72 from the second embodiment. In the full-bridge circuit 72, the first switch SW15 has a source connected to a drain of the second switch SW16. The first diode D15 has an anode connected to a cathode of the second diode D16. The first current sensor 38 is connected to a drain of the first switch SW15 to works to measure electrical current flowing in the first switch SW15 as the first reactor current IL1r. The second current sensor 39 is connected to a drain of the second switch SW16 and works to measure electrical current flowing in the second switch SW16 as the second reactor current IL2r.

Third Embodiment

The third embodiment will be referred to in terms of arrangements different from those in the first embodiment. Structural elements to which the same reference symbols as in the first embodiment are assigned are the same as those in the first embodiment, and explanation thereof in detail will be omitted here.

Figure 15:
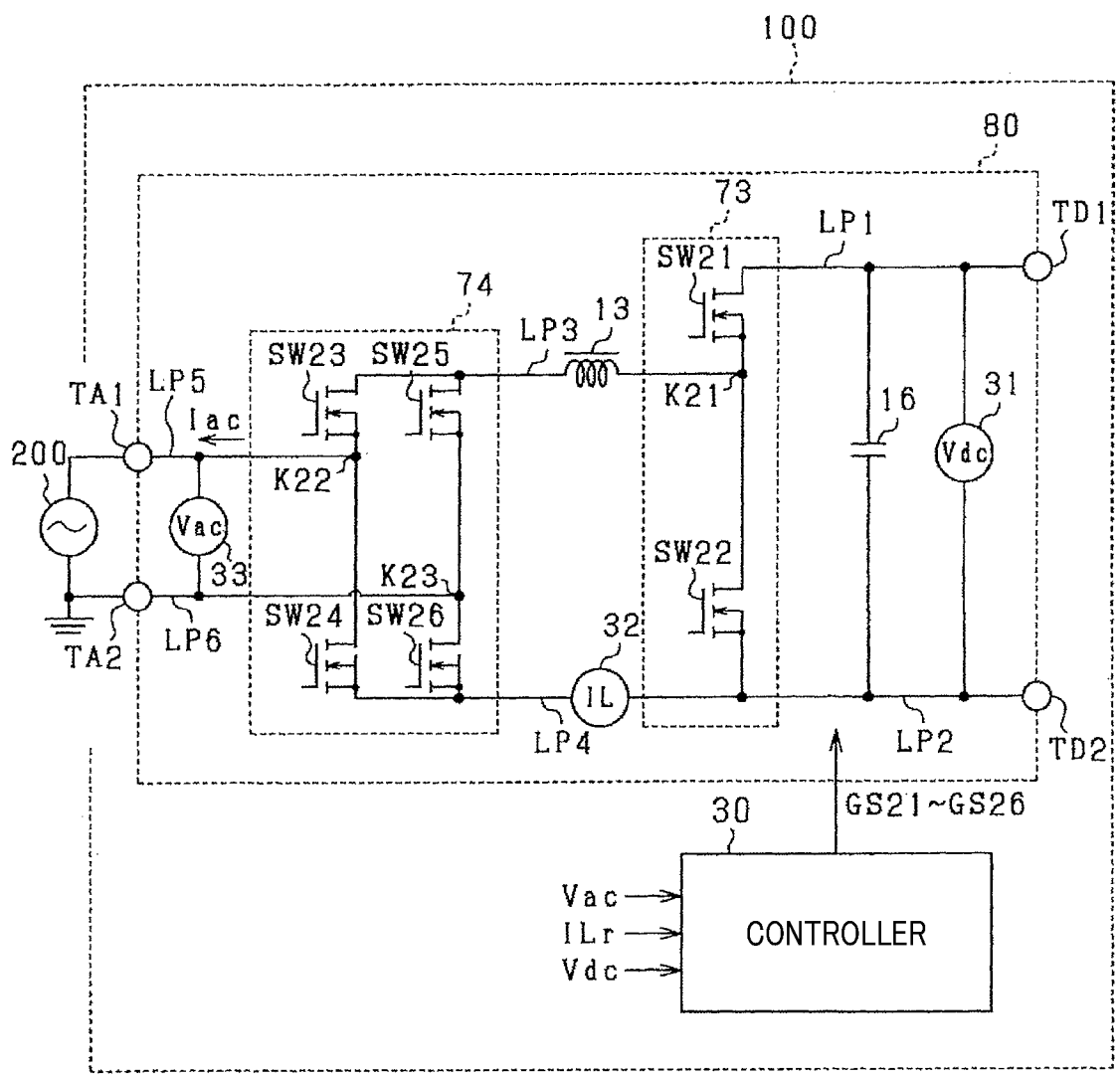
FIG. 15 is a structural view of an electrical power converter in the third embodiment.

The electrical power converter 100 in this embodiment works to convert the DC link voltage Vdc into the ac voltage Vac. The electrical power converter 100 illustrated in FIG. 15 is equipped with the DC-AC converter 80. The DC-AC converter 80 includes the capacitor 16, the half-bridge circuit 73, the reactor 13, the full-bridge circuit 74, and the first to sixth electrical wires LP1 to LP6.

The half-bridge circuit 73 includes the first switch SW21 and the second switch SW22. Each of the first and second switches SW21 and SW22 is of a voltage driven type and implemented by an n-channel MOSFET. The first switch SW21 has a source connected to a drain of the second switch SW22. A drain of the first switch SW21 is connected to the first electrical wire LP1. A source of the second switch SW22 is connected to the second electrical wire LP2. Each of the first and second switches SW21 and SW22 is equipped with a parasitic diode reverse-connected thereto. In this embodiment, the first switch SW21 corresponds to the drive switch.

The first junction K21 of the first and second switches SW21 and SW22 is connected to the first end of the third electrical wire LP3. The reactor 13 is disposed in the third electrical wire LP3. The second switch SW22 has a source connected to the first end of the fourth electrical wire LP4. The second end of each of the third and fourth electrical wires LP3 and LP4 is connected to the full-bridge circuit 74.

The full-bridge circuit 74 is equipped with the third to sixth switches SW23 to SW26. Each of the third to sixth switches SW23 to SW26 is of a voltage driven type and implemented by an n-channel MOSFET in this embodiment. The third switch SW23 has a source connected to a drain of the fourth switch SW24. The fifth switch SW25 has a source connected to a drain of the sixth switch SW26. A drain of each of the third and fifth switch SW23 and SW25 is connected to the third electrical wire LP3. A source of each of the fourth and sixth switches SW24 and SW26 is connected to the fourth electrical wire LP4.

The second junction K22 of the third switch SW23 and the fourth switch SW24 is connected to the first end of the fifth electrical wire LP5. The second end of the fifth electrical wire LP5 is connected to the first ac terminal TA1. The third junction K23 of the fifth switch SW25 and the sixth switch SW26 is connected to the first end of the sixth electrical wire LP6. The second end of the sixth electrical wire LP6 is connected to the second ac terminal TA2.

Figure 16:
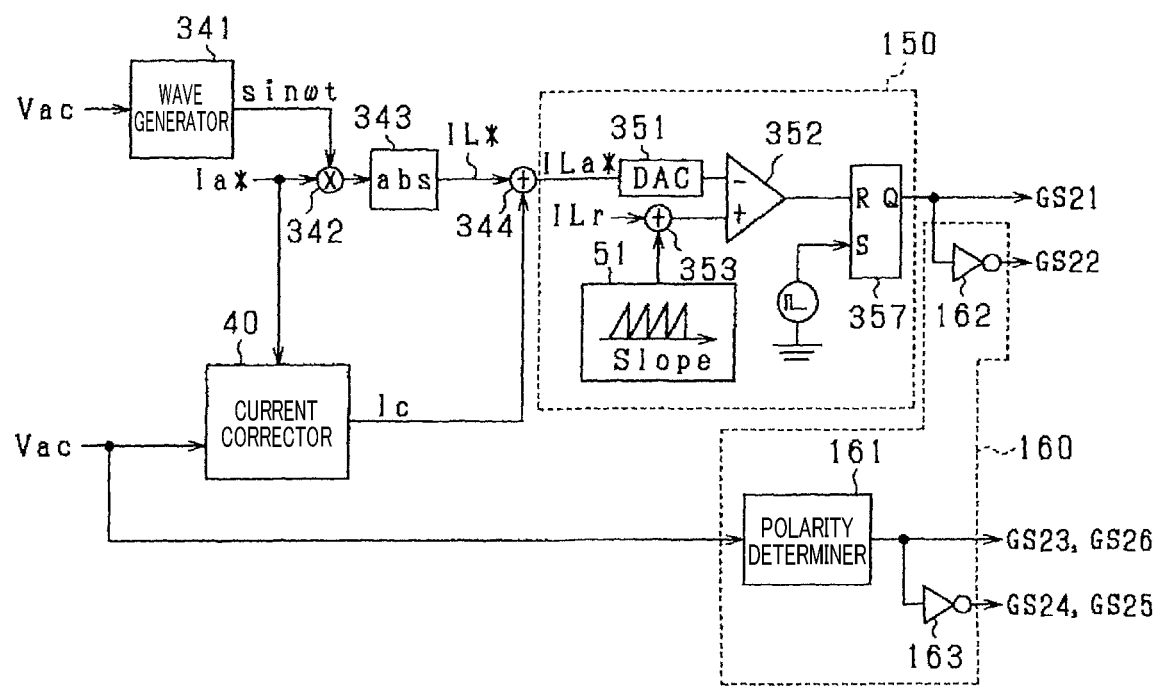
FIG. 16 is a functional block diagram which illustrates a control apparatus.

FIG. 16 is a functional block diagram which describes functions performed by the control apparatus 30 according to this embodiment. The control apparatus 30 turns off (i.e., opens) or turns on (i.e., closes) the first and second switches SW21 and 22 in the peak-current mode control.

The current controlling portion 150 outputs the first gate signal GS21 to operate the first switch SW1 and the second gate signal GS22 to operate the second switch SW2 based on the reactor current ILr and the corrected command current ILa*. The current controlling portion 150 is connected to the gate of the first switch SW21 and outputs the first gate signal GS21. The current controlling portion 150 is also connected to the gate of the second switch SW22 through the inverting unit 162 and outputs the second gate signal GS22 through the inverting unit 162.

The switching portion 160 is equipped with the polarity determining portion 161 and the inverting units 162 and 163. When determining the ac voltage Vac as being positive in electrical polarity, the polarity determining portion 161 works to change an output signal to a low level. Alternatively, when determining the ac voltage Vac as being negative, the polarity determining portion 161 changes the output signal to a high level.

The polarity determining portion 161 is connected to gates of the third and sixth switches SW23 and SW26 and outputs the third and sixth gate signals GS23 and GS26 to operate the third and sixth switches SW23 and SW26. The polarity determining portion 161 is also connected to gates of the fourth and fifth switches SW24 and SW25 through the inverting unit 163 and outputs the fourth and fifth gate signals GS24 and GS25 to operate the fourth and fifth switches SW24 and SW25 through the inverting unit 163. The fourth and fifth gate signals GS24 and GS25 have values which are inversion of those of the third and sixth gate signals GS23 and GS26.

Figure 17A:
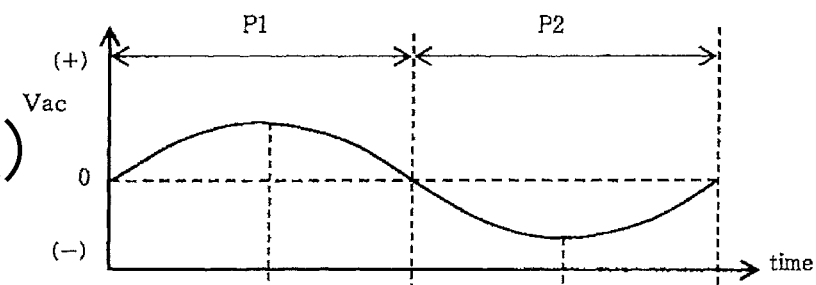
FIGS. 17(*a*) to 17(*c*) are views which describe a change in harmonic correction value.
Figure 17B:
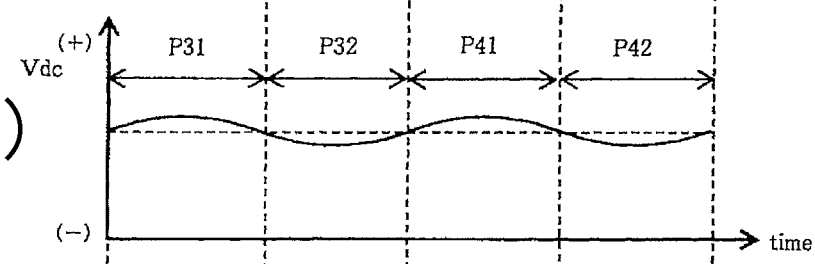
Figure 17C:
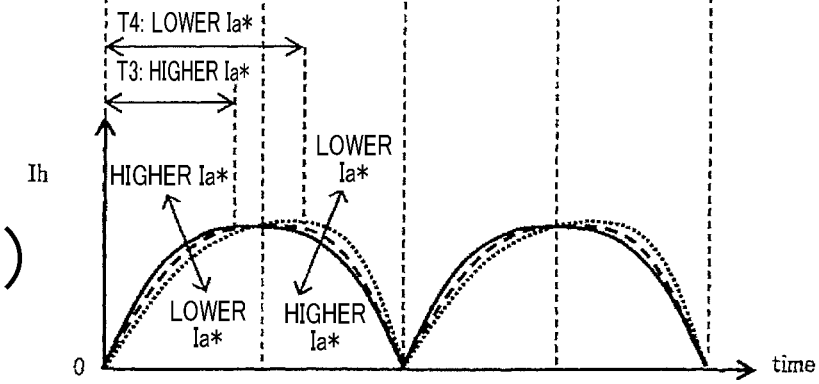

FIGS. 17(a) to 17(c) are views which demonstrate changes in the ac voltage Vac, the DC link voltage Vdc, and the current correction value Ic in this embodiment. In FIGS. 17(a) to 17(c), the DC link voltage Vdc changes at a frequency twice that of the ac voltage Vac. The current correction value Ic changes to have a maximum value in the first halves P31 and P41 of the first and second time periods P1 and P2 in which the ac voltage Vac is positive and then have a minimum value in the second halves P32 and P42 of the first and second time periods P1 and P2.

When the DC-AC converter 80 converts the DC link voltage Vdc into the ac voltage Vac, the deviation $\Delta i$ representing a difference between the averaged value Iave of the distorted reactor current ILr and the pre-correction command current IL* has a minimum value near the zero-cross time when the ac voltage Vac becomes zero. The deviation $\Delta i$ also has a maximum value near a peak time when the ac voltage Vac is maximized.

In this embodiment, the harmonic component generating portion 43 sets the harmonic correction value Ih at the upward zero crossing time of the DC link voltage Vdc to a minimum value thereof. Specifically, the harmonic component generating portion 43 sets the harmonic correction value Ih at the upward zero crossing time of the DC link voltage Vdc to zero. The harmonic component generating portion 43 also determines the harmonic correction value Ih to have at least one maximum value between time-series adjacent minimum values of the harmonic correction value Ih. The harmonic component generating portion 43 determines the harmonic correction value Ih at the zero-cross time of the DC link voltage Vdc to be a value regardless of the magnitude of the amplitude command value Ia*. Specifically, the harmonic correction value Ih at the upward zero crossing time of the DC link voltage Vdc is set to the same value regardless of the amplitude command value Ia*.

The greater the amplitude of the ac current Iac, the greater a deviation of the DC link voltage Vdc from an averaged value thereof will be. The harmonic component generating portion 43, therefore, sets the harmonic correction value Ih to increase with an increase in the amplitude command value Ia in the time periods P31 and P41 in which the DC link voltage Vdc is positive in electrical polarity. The harmonic component generating portion 43 also sets the harmonic correction value Ih to decrease with an increase in the amplitude command value Ia* in the time periods P32 and P42 in which the DC link voltage Vdc is negative in electrical polarity.

The harmonic component generating portion 43 sets the harmonic correction value Ih to decrease a time interval between the upward zero crossing time of the DC link voltage Vdc and a time when the harmonic correction value Ih is maximized as the amplitude command value Ia* increases. FIG. 17(c) demonstrates the harmonic correction values Ih in relation to the three different amplitude command values Ia*. FIG. 17(c) shows the time T3 when the amplitude command value Ia* is greater and the time T4 when the amplitude command value Ia* is smaller as a time required for the DC link voltage Vdc to have the maximum value from the upward zero crossing time. The time T3 for the greater amplitude command value Ia* is shorter than the time T4 for the smaller amplitude command value Ia*.

The control apparatus 30 in this embodiment also retains in a storage portion a correction map representing a relation among the ac voltage Vac, the amplitude command value Ia*, and the current correction value Ic. The harmonic component generating portion 43, therefore, looks up the correction map to specify the harmonic correction value Ih as a function of the amplitude command value Ia* and the ac voltage Vac.

How to make the correction map which represents the correspondence relation between the harmonic correction value Ih and the ac voltage Vac will be described below.

The inclination mb when the reactor current ILr is increasing meets a relation of mb=(Vdc−|Vac|)/L. By substituting such a relation into the above Eq. (1), the harmonic correction value Ih when the non-varying DC link voltage Vdc* is converted into the ac voltage Vac is derived according to equation (6) below.

[Number 5]

$$Ih = \frac{Vdc^* - |Vac|}{2L} \cdot D \cdot Tsw + ms \cdot D \cdot Tsw \quad (6)$$

When the DC-AC converter 80 converts the non-varying DC link voltage Vdc* into the ac voltage Vac, the duty cycle D is derived according to the following equation (7).

[Number 6]

$$D = \frac{|Vac|}{Vdc^*} \quad (7)$$

The DC-AC converter 80 calculates the pulsing DC link voltage Vdc according to the following equation (8).

[Number 7]

$$Vdc = Vdc^* + \frac{Vac \cdot Ia^*}{4\pi \cdot f \cdot Vdc^* \cdot C} \cdot \sin 2\theta \quad (8)$$

The duty cycle D which takes a variation in the DC link voltage Vdc into account is, therefore, derived according to the following equation (9) in which Vdc* in Eq. (7) is replaced with a right side in Eq. (8).

[Number 8]

$$D = \frac{|Vac|}{Vdc^* + \frac{Vac \cdot Ia^*}{2\pi \cdot f \cdot Vdc^* \cdot C} \cdot \sin 2\theta} \quad (9)$$

By replacing Vdc* in Eq. (6) with the DC link voltage Vdc derived according to Eq. (8), the following equation (10) is obtained.

[Number 9]

$$Ic = \frac{Vdc^* + \frac{Vac \cdot Ia^*}{4\pi \cdot f \cdot Vdc^* \cdot C} \cdot \sin 2\theta - |Vac|}{2L} \cdot D \cdot Tsw + ms \cdot D \cdot Tsw \quad (10)$$

This embodiment uses Eqs. (9) and (10) to calculate the harmonic correction values Ih as a function of the amplitude command values Ia* and the ac voltages Vac. Each of the harmonic correction values Ih calculated in this way is combined with corresponding ones of the amplitude command values Ia* and the ac voltages Vac to make the correction map.

Figure 18A:
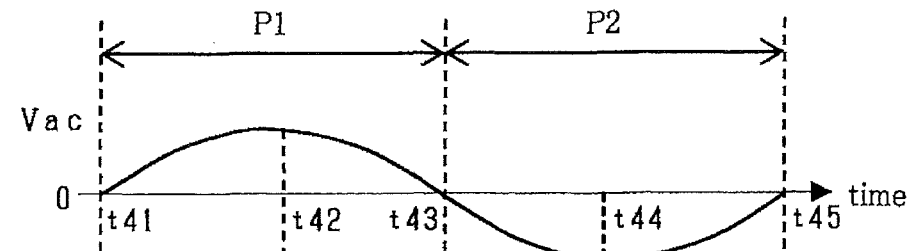
FIGS. 18(*a*) to 18(*f*) are time charts for an electrical power converter.
Figure 18B:
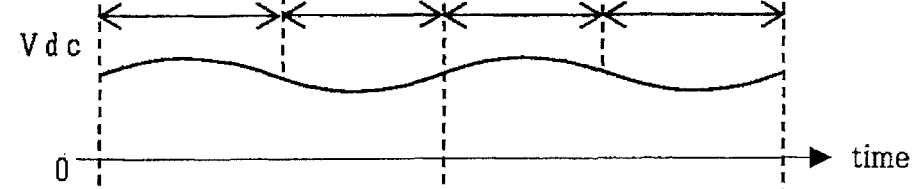
Figure 18C:
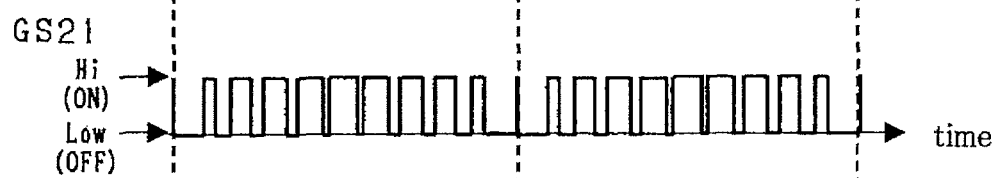
Figure 18D:
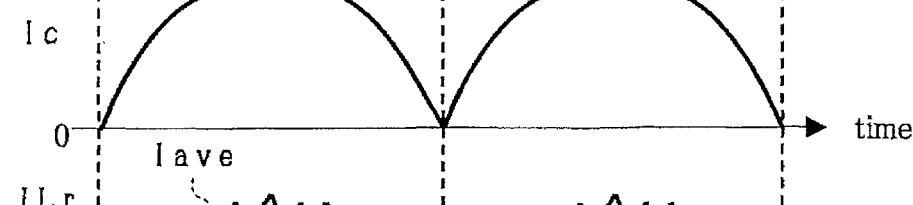
Figure 18E:
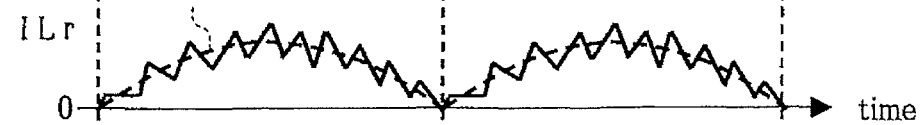
Figure 18F:
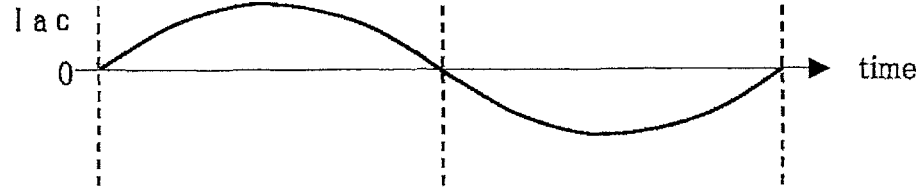

The operation of the electrical power converter 100 will be described below using FIGS. 18(a) to 18(f). FIG. 18(a) demonstrates a change in the ac voltage Vac. FIG. 18(b) demonstrates a change in the DC link voltage Vdc. FIG. 18(c) demonstrates a change in the first gate signal GS21. The second gate signal GS22 has a value that is inversion of that of the first gate signal GS21. FIG. 18(d) demonstrates a change in the current correction value Ic. FIG. 18(e) demonstrates a change in the reactor current ILr. FIG. 18(f) demonstrates a change in the ac current Iac. The current correction value Ic illustrated in FIG. 18(d) is a value when the harmonic correction value Ih is lower than the upper limit Idc and, thus, identical with the harmonic correction value Ih. Times t41, t43, and t45 in FIG. 18(a) show the zero-cross times of the ac voltage Vac. Times t42 and t44 show peak times when the ac voltage Vac has a positive and a negative peak, respectively.

In the first time period P1 in which the ac voltage Vac is positive in electrical polarity, the fourth and fifth gate signals GS24 and GS25 are changed to the high level, thereby turning on or closing the fourth and fifth switches SW24 and SW25. The third and sixth gate signals GS23 and GS26 are changed to the low level, thereby turning off or opening the third and sixth switches SW23 and SW26. In the first time period P1, the current controlling portion 150, therefore, executes the peak-current mode control to change the first gate signal GS21 to the high level and also change the second gate signal GS22 to the low level, thereby creating a closed circuit including the fourth and fifth switches SW24 and SW25, the reactor 13, and the second switch SW22.

In the first time period P1, the current correction value Ic changes to have a minimum value at time t41 and time t43 in the time period P31 in which the DC link voltage Vdc is positive in electrical polarity and then have a maximum value near time t42. In a relation to a change in the ac voltage Vac, the current correction value Ic changes to have a minimum value at the zero-cross times t41 and t43 and also to have a maximum value near the peak time t42 of the ac voltage Vac. In other words, the current correction value Ic has the minimum value at the zero-cross time when the deviation Δi is small, while the current correction value Ic has the maximum value at the peak time when the deviation Δi is great. This reduces the distortion of the ac current Iac in the first time period P1.

In the second time period P2 in which the ac voltage Vac is negative in electrical polarity, the fourth and fifth gate signals GS24 and GS25 are changed to the low level to turn off or open the fourth and fifth switches SW24 and SW25.

The third and sixth gate signals GS23 and GS26 are changed to the high level to turn on or close the third and sixth switches SW23 and SW26. Accordingly, in the second time period P2, the current controlling portion 150 changes the first gate signal GS21 to the high level and also changes the second gate signal GS22 to the low level, thereby creating a closed circuit including the third and sixth switches SW23 and SW26, the reactor 13, and the second switch SW22.

In the second time period P2, the current correction value Ic changes to have a maximum value near time t44 and a minimum value near time t45 in the time period P42 when the DC link voltage Vdc is positive in electrical polarity. In a relation to a change in the ac voltage Vac, the current correction value Ic changes to have a minimum value at the zero-cross time t45 and a maximum value at the peak time t44. Accordingly, the current correction value Ic is, like in the first time period P1, set to a minimum value at the zero-cross time and also set to a maximum value near the peak time, thereby reducing the distortion of the ac current Iac.

Figure 19:
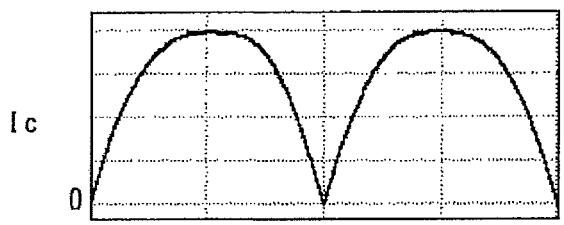
FIGS. 19(*a* 1) to 19(*c*2) are views which represent beneficial advantages provided by an embodiment.
Figure 19:
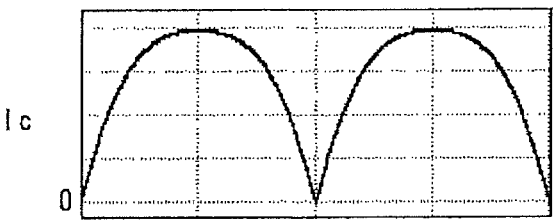
Figure 19:
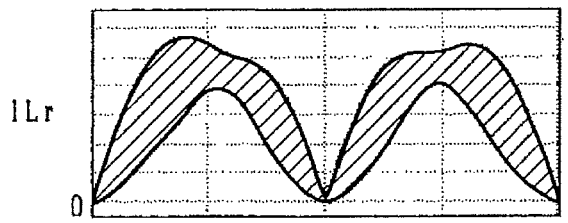
Figure 19:
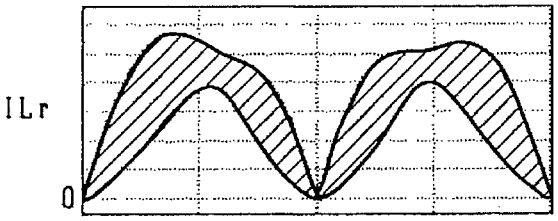
Figure 19:
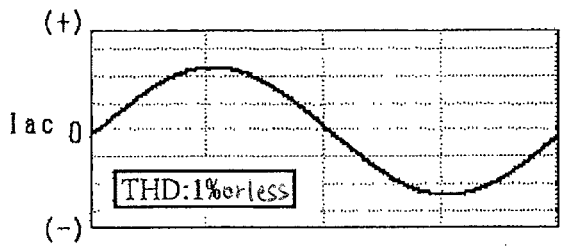
Figure 19:
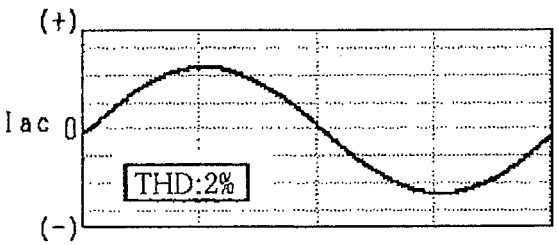

FIGS. 19(a1), 19(b1), and 19(c1) are views which demonstrate changes in the current correction value Ic, the reactor current ILr, and the ac current Iac in this embodiment. FIGS. 19(a2), 19(b2), and 19(c2) are views which demonstrate changes in the current correction value Ic, the reactor current ILr, and the ac current Iac in a comparative example. In the comparative example, the current correction value Ic is determined as a function of a change in the ac voltage Vac regardless of a change in the DC link voltage Vdc.

The reactor current ILr shown in FIG. 19(b2) flows in the reactor 13 in the peak-current mode control using the current correction value Ich shown in FIG. 19(a2). The ac current Iac shown in FIG. 19(c2) is distorted. In the comparative example, a total distortion percentage THD of the ac current Iac is 2%. In contrast, the current correction value Ic shown in FIG. 19(a1) is determined in light of a change in the DC link voltage Vdc in addition to a change in the ac voltage Vac. The reactor current ILr shown in FIG. 19(b1) flows in the reactor 13 in the peak-current mode control using the current correction value Ic shown in FIG. 19(a1). This reduces the distortion of the ac current Iac in FIG. 19(c1) to a degree greater than that demonstrated in FIG. 19(c2). For example, a total distortion percentage THD of the ac current Iac in FIG. 19(c1) is 1% or less.

The above described embodiment has the following beneficial advantages.

The control apparatus 30 is used with the electrical power converter 100 working to convert the DC link voltage Vdc into the ac voltage Vac. The control apparatus 30 determines the harmonic correction value Ih to have a minimum value at the upward zero crossing time of the DC link voltage Vdc in each cycle of the DC link voltage Vdc and a maximum value between time-series adjacent minimum values thereof. This offers substantially the same beneficial advantages as those in the first embodiment to conversion of the DC link voltage Vdc into the ac voltage Vac.

The control apparatus 30 determines the harmonic correction value Ih to increase with an increase in the amplitude command value Ia* in a period of time when the DC link voltage Vdc is positive in electrical polarity and alternatively to decrease with an increase in the amplitude command value Ia* in a period of time when the DC link voltage Vdc is negative in electrical polarity. This greatly reduces the distortion of the ac current Iac by increasing or decreasing the harmonic correction value Ih as a function of a change in the DC link voltage Vdc arising from an increase in the amplitude command value Ia* in the conversion of the DC link voltage Vdc into the ac voltage Vac.

Fourth Embodiment

The fourth embodiment will be referred to in terms of arrangements different from those in the third embodiment. Structural elements to which the same reference symbols as in the third embodiment are assigned are the same as those in the third embodiment, and explanation thereof in detail will be omitted here.

This embodiment is different in circuit topology of the electrical power converter 100 from that in the third embodiment. Specifically, the electrical power converter 100 in this embodiment is, unlike the third embodiment, not equipped with a half bridge circuit.

Figure 20:
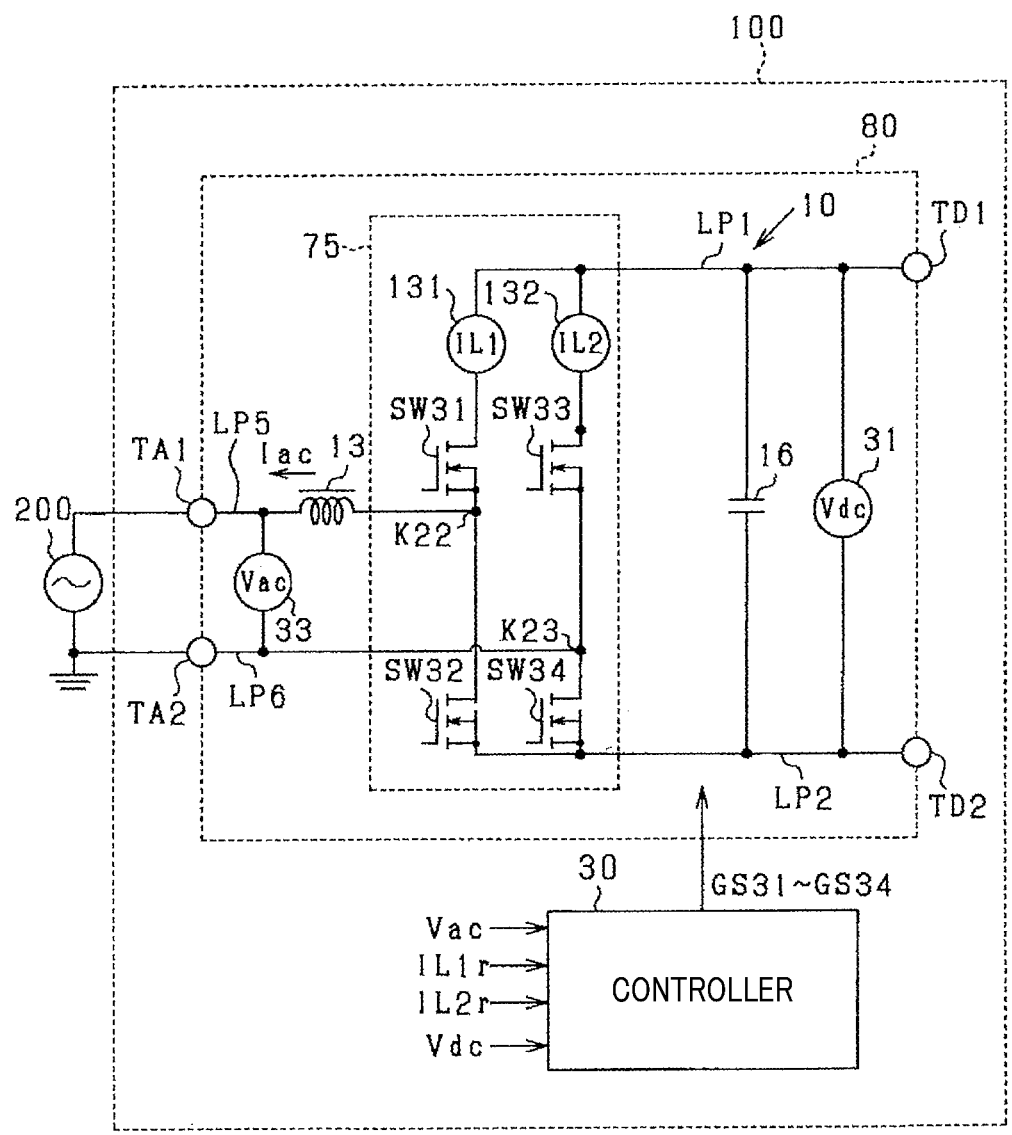
FIG. 20 is a structural view which illustrates an electrical power converter in the fourth embodiment.

FIG. 20 is a structural view of the electrical power converter 100 in this embodiment. The first dc terminal TD1 and the full-bridge circuit 75 are connected together through the first electrical wire LP1. The second dc terminal TD2 and the full-bridge circuit 75 are connected together through the second electrical wire LP2.

The full-bridge circuit 75 is equipped with the first to fourth switches SW31 to SW34. Each of the first to fourth switches SW31 to SW34 is of a voltage driven type and implemented by an n-channel MOSFET in this embodiment. The first to fourth switches SW31 to SW34 correspond to the third to sixth switches SW23 to SW26 in the third embodiment. The explanation of the full-bridge circuit 75 will, therefore, be omitted here.

The first current sensor 131 is connected to the drain of the first switch SW31 and works to measure electrical current flowing in the first switch SW31 as the first reactor current IL1r. The second current sensor 132 is connected to the drain of the third switch SW33 and works to measure electrical current flowing in the third switch SW33 as the second reactor current IL2r.

Figure 21:
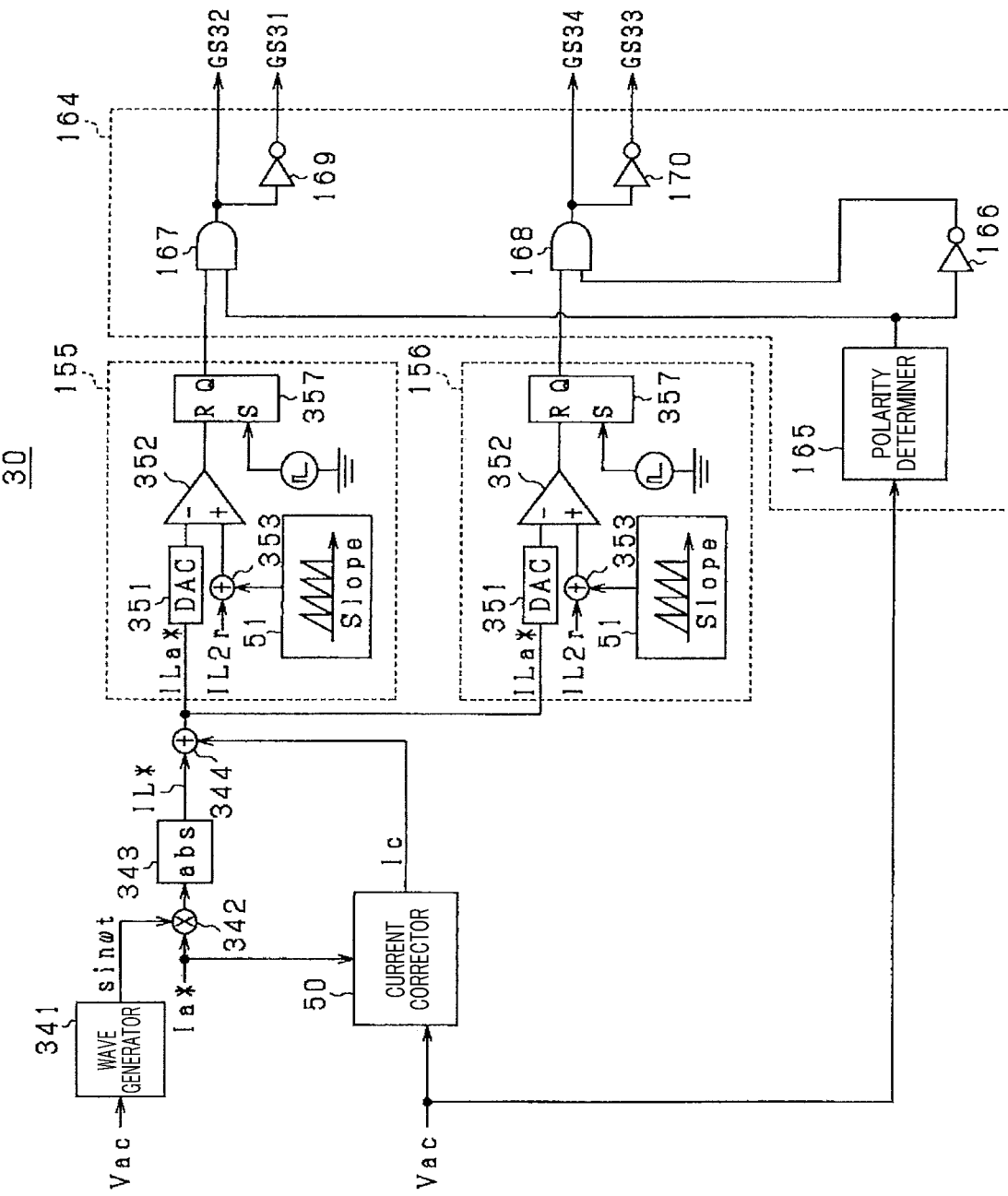
FIG. 21 is a functional block diagram which illustrates a control apparatus.

FIG. 21 is a functional block diagram which illustrates functions performed by the control apparatus 30 in the fourth embodiment. In this embodiment, the control apparatus 30 turns off (i.e., opens) or turns on (i.e., closes) the first to fourth switches SW31 to SW34 in the peak-current mode control.

The control apparatus 30 includes the first current controlling portion 155, the second current controlling portion 156, and the switching portion 164. The first current controlling portion 155 executes the peak-current mode control to bring the first reactor current IL1r whose slope has been compensated for into agreement with the corrected command current ILa*. The second current controlling portion 156 executes the peak-current mode control to bring the second reactor current IL2r whose slope has been compensated for into agreement with the corrected command current ILa*. The first and second current controlling portions 155 and 156 each have the same structure as that of the current controlling portion 50, and explanation thereof in detail will be omitted here.

The switching portion 164 includes the polarity determining portion 165, the first AND circuit 167, the second AND circuit 168, and the inverting units 166, 169, and 170. The polarity determining portion 165 has an output terminal connected to one of input terminals of the first AND circuit 167 and an input terminal of the inverting unit 166. The inverting unit 166 has an output terminal connected to one of input terminals of the second AND circuit 168.

The output terminal of the first current controlling portion 155 is connected to the other input terminal of the first AND circuit 167. The output terminal of the second current controlling portion 157 is connected to the other input terminal of the second AND circuit 168. The first AND circuit 167 is connected to the gate of the second switch SW32 and outputs the second gate signal GS32. The first AND circuit 167 is connected to the gate of the first switch SW31 through the inverting unit 169 and outputs the first gate signal GS31 through the inverting unit 169. The first gate signal GS31 has a value that is inversion of that of the second gate signal GS32.

The second AND circuit 168 is connected to the gate of the fourth switch SW34 and outputs the fourth gate signal GS34. The second AND circuit 168 is connected to the gate of the third switch SW33 through the inverting unit 170 and outputs the third gate signal GS33 through the inverting unit 170. The third gate signal GS33 is inversion of the fourth gate signal GS34.

FIGS. 22(a) to 22(i) are time charts for the electrical power converter 100 in the fourth embodiment. FIG. 22(a) demonstrates a change in the ac voltage Vac. FIG. 22(b) demonstrates a change in the DC link voltage Vdc. FIG. 22(c) demonstrates a change in the first switching signal AQ1. FIG. 22(d) demonstrates a change in the second switching signal AQ2. FIG. 22(e) demonstrates a change in the first gate signal GS31. FIG. 22(f) demonstrates a change in the third gate signal GS33. FIG. 22(g) demonstrates a change in the current correction value Ic. FIG. 22(h) demonstrates a change in the reactor current ILr. FIG. 22(i) demonstrates a change in the ac current Iac. The current correction value Ic in FIG. 22(g) is a value when the harmonic correction value Ih is lower than the upper limit Idc and identical with the harmonic correction value Ih. Times t51, t53, and t55 in FIG. 22(a) are the zero-cross times of the ac voltage Vac. Times t52 and t54 are peak times when the ac voltage Vac has a positive peak and a negative peak, respectively.

In the first time period P1 in which the ac voltage Vac is positive in electrical polarity, the fourth gate signal GS34 is changed to the high level, while the second gate signal GS32 is changed to the low level. In the first time period P1, the first gate signal GS31 is outputted in the peak-current mode control executed by the first current controlling portion 155 to bring the first reactor current IL1r whose slope has been compensated for into agreement with the corrected command current ILa*.

In the first time period P1, the current correction value Ic changes to have a minimum value near time t51 and also to have a maximum value near time t52 in the time period P31 in which the DC link voltage Vdc is positive in electrical polarity. The current correction value Ic also changes to have a minimum value at time t53 in the time period P32 when the DC link voltage Vdc is negative in electrical polarity. In a relation to a change in the ac voltage Vac, the current correction value Ic changes to have the minimum value at the zero-cross times t51 and t53 and also to have the maximum value near the peak time t52. The duty cycle of the first gate signal GS31 is, therefore, smaller near the zero-cross time and greater near the peak time than when the current correction value Ic is kept constant. This reduces the distortion of the ac current Iac in the first time period P1.

In the second time period P2 when the ac voltage Vac is negative in electrical polarity, the fourth gate signal GS34 is changed to the low level, while the second gate signal GS32 is changed to the high level. In the second time period P2, the third gate signal GS33 is outputted in the peak-current mode control executed by the second current controlling portion 156 to bring the second reactor current IL2r whose slope has been compensated for into agreement with the corrected command current ILa*.

In the second time period P2, the current correction value Ic changes to have a maximum value near time t54 in the time period P41 when the DC link voltage Vdc is positive in electrical polarity and also to have a minimum value at time t55 in the time period P42 when the DC link voltage Vdc is negative in electrical polarity. In a relation to a change in the ac voltage Vac, the current correction value Ic changes to have the minimum value at the zero-cross time t55 and also to have the maximum value near the peak time t54. The duty cycle of the second gate signal GS32 is, therefore, lower near the zero-cross time and higher near the peak time than when the current correction value Ic is kept constant. This reduces the distortion of the ac current Iac in the second time period P2.

The above described embodiment offers substantially the same beneficial advantages as those in the third embodiment.

Other Embodiments

The harmonic correction value Ih used in converting the ac voltage Vac into the DC link voltage Vdc in the electrical power converter 100 may alternatively be calculated instead of the above Eqs. (2) and (5). For instance, in a case where the amplitude command value Ia* is set to a fixed value, the harmonic correction value Ih may be determined using only the ac voltage Vac, not the amplitude command value Ia*. In this case, the harmonic correction value Ih is determined to change to have a single maximum value in each of periods of time when the DC link voltage Vdc is positive and negative in electrical polarity, respectively, within one cycle of change in the DC link voltage Vdc and also have a single minimum value between the adjacent maximum values when the DC link voltage Vdc is positive and negative, respectively.

The harmonic correction value Ih used in converting the DC link voltage Vdc into the ac voltage Vac in the electrical power converter 100 may alternatively be calculated instead of the above Eqs. (9) and (10). For instance, in a case where the amplitude command value Ia* is set to a fixed value, the harmonic correction value Ih may be determined using only the ac voltage Vac, not the amplitude command value Ia*. In this case, the harmonic correction value Ih is determined to change to have a single minimum value in each of the periods of time when the DC link voltage Vdc is positive and negative in electrical polarity, respectively, within one cycle of the DC link voltage Vdc and also have a single maximum value between the adjacent minimum values when the DC link voltage Vdc is positive and negative, respectively.

Each of the above embodiments refers to a case where the power factor is set to one, but however, may alternatively be used with a case where the power factor is less than one. In such a case, the wave generating portion 341 serves to produce a reference waveform ($=\sin(\omega t+\alpha)$) whose phase is shifted from the ac voltage Vac by a given amount $\alpha$ as a function of the power factor. The pre-correction command current IL* is calculated using the produced reference waveform. The deviation $\Delta i$ between the pre-correction command current IL* determined as a function of the power factor and the averaged value Iave of the reactor current ILr may be determined to calculate the harmonic correction value Ih as a function of the deviation $\Delta i$.

The electrical power converter 100 may be designed to achieve power conversion from the ac voltage Vac to the DC link voltage Vdc and vice versa.

The above described controllers or operations thereof may be realized by a special purpose computer which is equipped with a processor and a memory and programmed to execute one or a plurality of tasks created by computer-executed programs or alternatively established by a special purpose computer equipped with a processor made of one or a plurality of hardware logical circuits. The controllers or operations may alternatively be realized by a combination of an assembly of a processor with a memory which is programmed to perform one or a plurality of tasks and a processor made of one or a plurality of hardware logical circuits. Computer-executed programs may be stored as computer executed instructions in a non-transitory computer readable medium.

While this disclosure has been referred to in terms of the preferred embodiments, it should be appreciated that this disclosure is not limited to the embodiments or structures. Therefore, this disclosure should be understood to include all possible embodiments and modifications to the shown embodiments which can fall in a scope of this disclosure or a scope of technical ideas in this disclosure.

What is claimed is:

1. A control apparatus for use with an electrical power converter which is equipped with a reactor, a drive switch, and a capacitor and works to convert an inputted one of an ac voltage and a terminal-to-terminal voltage at the capacitor into the other, comprising:
a current obtaining portion which obtains a reactor current flowing in the reactor;
an ac voltage obtaining portion which obtains the ac voltage;
a command value calculating portion which calculates a sine-wave command value for the reactor current based on the obtained ac voltage;
a current correcting portion which determines a correction value to be added to the calculated command value;
a current controlling portion which operates the drive switch in peak-current mode control to bring the obtained reactor current into agreement with the command value to which the correction value is added,
wherein the current correcting portion sets the correction value to a value including a component of fluctuation in the terminal-to-terminal voltage based on the ac voltage.

2. The control apparatus, as set forth in claim 1, wherein the electrical power converter works to convert the ac voltage into the terminal-to-terminal voltage at the capacitor, and
the current correcting portion sets the correction value to have a single maximum value in each of time periods in which the terminal-to-terminal voltage at the capacitor is positive in electrical polarity and negative in electrical polarity in one cycle of change in the terminal-to-terminal voltage and also have a single minimum value between the maximum value in the time period in which the terminal-to-terminal voltage is positive and the maximum value in the time period in which the terminal-to-terminal voltage is negative.

3. The control apparatus, as set forth in claim 2, wherein the command value calculating portion calculates the command value based on the obtained ac voltage and an amplitude command value representing an amplitude of the reactor current, and
the current correcting portion sets the correction value to decrease with an increase in the amplitude command value in the time period in which the terminal-to-terminal voltage at the capacitor is negative in electrical polarity and alternatively sets the correction value to increase with an increase in the amplitude command value in the time period in which the terminal-to-terminal voltage at the capacitor is positive in electrical polarity.

4. The control apparatus, as set forth in claim 3, wherein the current correcting portion calculates the correction value according to equations (1) and (2) below $$Ih = \frac{|Vac|}{2L} \cdot D \cdot Tsw + ms \cdot D \cdot Tsw \qquad (1)$$

$$D = 1 - \frac{|Vac|}{Vdc^* - \frac{Vac \cdot Ia^*}{4\pi \cdot f \cdot Vdc^* \cdot C} \cdot \sin 2\theta} \qquad (2)$$

where Ih is the correction value, D is a duty cycle for the drive switch, Vac is the ac voltage, Vdc* is the terminal-to-terminal voltage at the capacitor when it is not fluctuating, Ia* is the amplitude command value, f is a frequency of the ac voltage, C is an electrostatic capacitance of the capacitor, and θ is a phase of the ac voltage.

5. The control apparatus, as set forth in claim 2, wherein the command value calculating portion calculates the command value based on the obtained ac voltage and the amplitude command value representing an amplitude of the reactor current, and
the current correcting portion sets the correction value to decrease a time interval between a time when the terminal-to-terminal voltage at the capacitor drops and crosses zero and a time when the correction value is minimized as the amplitude command value increases and also decrease a time interval between the time when the terminal-to-terminal voltage drops and crosses zero and a time when the correction value is maximized as the amplitude command value increases.

6. The control apparatus, as set forth in claim 1, wherein the electrical converter works to convert the terminal-to-terminal voltage at the capacitor into the ac voltage, and
wherein the current correcting portion sets the correction value to have a minimum value at a time when the terminal-to-terminal voltage rises and crosses zero and also have a maximum value between time-series adjacent minimum values of the correction value in one cycle of change in the terminal-to-terminal voltage at the capacitor.

7. The control apparatus, as set forth in claim 6, wherein the command value calculating portion calculates the command value based on the obtained ac voltage and the amplitude command value representing an amplitude of the reactor current, and
the current correcting portion sets the correction value to have a greater value with an increase in the amplitude command value in a time period in which the terminal-to-terminal voltage at the capacitor is positive in electrical polarity and also have a smaller value with an increase in the amplitude command value in a time period in which the terminal-to-terminal voltage at the capacitor is negative in electrical polarity.

8. The control apparatus, as set forth in claim 7, wherein the current correcting portion calculates the correction value according to equations (3) and (4) below $$Ih = \frac{Vdc^* + \frac{Vac \cdot Ia^*}{4\pi \cdot f \cdot Vdc^* \cdot C} \cdot \sin 2\theta - |Vac|}{2L} \cdot D \cdot Tsw + ms \cdot D \cdot Tsw \qquad (3)$$

$$D = \frac{|Vac|}{Vdc^* + \frac{Vac \cdot Ia^*}{2\pi \cdot f \cdot Vdc^* \cdot C} \cdot \sin 2\theta} \quad (4)$$

where Ih is the correction value, D is a duty cycle for the drive switch, Vac is the ac voltage, Vdc* is the terminal-to-terminal voltage at the capacitor when it is not fluctuating, Ia* is the amplitude command value, f is a frequency of the ac voltage, C is an electrostatic capacitance of the capacitor, and θ is a phase of the ac voltage.

9. The control apparatus, as set forth in claim 6, wherein
the command value calculating portion calculates the command value based on the obtained ac voltage and the amplitude command value representing an amplitude of the reactor current, and
the current correcting portion sets the correction value to shorten a time interval between a upward zero crossing time of the terminal-to-terminal voltage at the capacitor and a time when the correction value is maximized as the amplitude command value increases.

\* \* \* \* \*